US011232777B2

(12) United States Patent
Sekiya et al.

(10) Patent No.: US 11,232,777 B2
(45) Date of Patent: Jan. 25, 2022

(54) INFORMATION PROCESSING DEVICE

(71) Applicant: Sony Corporation, Tokyo (JP)

(72) Inventors: Toshiyuki Sekiya, Kanagawa (JP); Yuichiro Koyama, Tokyo (JP); Yuya Hirano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/517,365

(22) Filed: Jul. 19, 2019

(65) Prior Publication Data

US 2019/0341019 A1 Nov. 7, 2019

Related U.S. Application Data

(63) Continuation of application No. 15/766,241, filed as application No. PCT/JP2016/079855 on Oct. 6, 2016, (Continued)

(30) Foreign Application Priority Data

Oct. 13, 2015 (JP) .................................. 2015-201723
Jul. 5, 2016 (JP) .................................. 2016-133593
Sep. 12, 2016 (JP) .................................. 2016-177402

(51) Int. Cl.
*G10K 11/178* (2006.01)
*G10L 21/0208* (2013.01)
(Continued)

(52) U.S. Cl.
CPC .. *G10K 11/17823* (2018.01); *G10K 11/17853* (2018.01); *G10L 21/0208* (2013.01);
(Continued)

(58) Field of Classification Search
CPC ....... G10K 11/17823; G10K 11/17853; G10K 2210/1081; G10K 2210/3028;
(Continued)

(56) References Cited

U.S. PATENT DOCUMENTS 5,251,263 A 10/1993 Andrea
5,793,875 A 8/1998 Lehr et al.
(Continued)

FOREIGN PATENT DOCUMENTS

CN 101911723 A 12/2010
CN 202998463 U 6/2013
(Continued)

OTHER PUBLICATIONS

International Search Report and Written Opinion and English translation thereof dated Dec. 13, 2016 in connection with International Application No. PCT/JP2016/079855.
(Continued)

*Primary Examiner* — William A Jerez Lora
(74) *Attorney, Agent, or Firm* — Wolf, Greenfield & Sacks, P.C.

(57) ABSTRACT

[Object] To collect a target sound in a more suitable aspect even under an environment in which noise occurs at random. [Solution] An information processing device including: a sound collection unit; and a holding member configured to have a projection portion with a streamline shape in at least a part and hold the sound collection unit so that the sound collection unit is located at a front end or near the front end of the projection portion.

9 Claims, 25 Drawing Sheets

Related U.S. Application Data now Pat. No. 10,565,976, which is a continuation-in-part of application No. PCT/JP2016/073655, filed on Aug. 10, 2016.

(51) Int. Cl.

| | | |
|---|---|---|
| *H04M 1/03* | (2006.01) | |
| *H04R 3/00* | (2006.01) | |
| *H04R 1/02* | (2006.01) | |
| *H04M 1/60* | (2006.01) | |
| *H04M 1/05* | (2006.01) | |
| *H04R 1/40* | (2006.01) | |
| *H04R 1/04* | (2006.01) | |

(52) U.S. Cl.
CPC .............. *H04M 1/03* (2013.01); *H04R 1/025* (2013.01); *H04R 3/005* (2013.01); *G10K 2210/1081* (2013.01); *G10K 2210/3028* (2013.01); *G10K 2210/3046* (2013.01); *H04M 1/05* (2013.01); *H04M 1/6008* (2013.01); *H04R 1/04* (2013.01); *H04R 1/406* (2013.01); *H04R 2410/07* (2013.01); *H04R 2420/07* (2013.01)

(58) Field of Classification Search
CPC ....... G10K 2210/3046; G10L 21/0208; H04M 1/03; H04M 1/05; H04M 1/6008; H04R 3/00; H04R 1/02; H04R 1/025; H04R 1/04; H04R 1/40
USPC ... 381/71.1, 71.2, 71.6, 71.7, 91, 94.1, 94.3, 381/355
See application file for complete search history.

(56) References Cited

U.S. PATENT DOCUMENTS

| | | | |
|---|---|---|---|
| 8,842,848 B2* | 9/2014 | Donaldson ........... | H04R 1/1083 381/74 |
| 8,897,455 B2* | 11/2014 | Visser ................. | G10L 21/0208 381/56 |
| 2004/0160571 A1 | 8/2004 | Jannard et al. | |
| 2005/0153750 A1 | 7/2005 | Gantz et al. | |
| 2008/0201138 A1 | 8/2008 | Visser et al. | |
| 2008/0226061 A1 | 9/2008 | Marash | |
| 2009/0190769 A1 | 7/2009 | Wang et al. | |
| 2009/0279709 A1 | 11/2009 | Asada | |
| 2012/0051548 A1 | 3/2012 | Visser et al. | |
| 2012/0162259 A1 | 6/2012 | Sakai | |
| 2014/0172421 A1 | 6/2014 | Liu | |
| 2014/0185827 A1* | 7/2014 | Kitazawa .............. | H04R 3/005 381/94.2 |
| 2014/0233752 A1 | 8/2014 | Seo et al. | |
| 2014/0270244 A1* | 9/2014 | Fan ...................... | G10K 11/002 381/91 |
| 2014/0278385 A1 | 9/2014 | Fan | |
| 2015/0049892 A1 | 2/2015 | Petersen et al. | |
| 2015/0073907 A1* | 3/2015 | Purves ................. | G06Q 20/32 705/14.58 |
| 2015/0264474 A1 | 9/2015 | Seo | |
| 2015/0280763 A1 | 10/2015 | Ko et al. | |
| 2015/0310857 A1 | 10/2015 | Habets et al. | |
| 2015/0382096 A1* | 12/2015 | Lamar ................. | H04R 1/1083 381/74 |
| 2016/0155453 A1 | 6/2016 | Harvey et al. | |
| 2016/0165340 A1* | 6/2016 | Benattar .............. | H04R 29/006 381/92 |
| 2017/0118740 A1 | 4/2017 | Jang et al. | |
| 2017/0127175 A1 | 5/2017 | Sanders | |
| 2017/0150255 A1 | 5/2017 | Wang et al. | |
| 2018/0286376 A1 | 10/2018 | Sekiya et al. | |

FOREIGN PATENT DOCUMENTS

| | | |
|---|---|---|
| CN | 103700373 A | 4/2014 |
| CN | 104010241 A | 8/2014 |
| CN | 104951065 A | 9/2015 |
| EP | 2469323 A1 | 6/2012 |
| JP | 51-000248 Y1 | 1/1976 |
| JP | 2005-534269 A | 11/2005 |
| JP | 2007-519342 A | 7/2007 |
| JP | 2008-507926 A | 3/2008 |
| JP | 2012-133250 A | 7/2012 |
| JP | 2012-203122 A | 10/2012 |
| JP | 2013072977 A | 4/2013 |
| JP | 2014-023141 A | 2/2014 |
| JP | 2014-045236 A | 3/2014 |
| JP | 2015520551 A | 7/2015 |
| KR | 101545147 B1 | 8/2015 |
| WO | WO 1997/040645 A1 | 10/1997 |
| WO | WO 2004/012477 A2 | 2/2004 |
| WO | WO 2005/071929 A1 | 8/2005 |
| WO | WO 2006/028587 A2 | 3/2006 |
| WO | WO 2011/103488 A1 | 8/2011 |
| WO | WO 2015/003220 A1 | 1/2015 |
| WO | WO 2015/003220 A9 | 1/2015 |
| WO | WO-2015024602 A | 2/2015 |

OTHER PUBLICATIONS

International Preliminary Report on Patentability and English translation thereof dated Apr. 26, 2018 in connection with International Application No. PCT/JP2016/079855.
International Search Report and Written Opinion and English translation thereof dated Nov. 1, 2016 in connection with International Application No. PCT/JP2016/073655.
International Preliminary Report on Patentability and English translation thereof dated Apr. 26, 2018 in connection with International Application No. PCT/JP2016/073655.
Extended European Search Report dated Oct. 15, 2018 in connection with European Application No. 16855346.9.
Chinese Office Action dated Apr. 18, 2019 in connection with Chinese Application No. 201680058465.X, and English translation thereof.
Lawrin-Ore et al., Reference Microphone Selection for MWF-based Noise Reduction Using Distributed Microphone Arrays, Proc. 10. ITG Symposium on Speech Communication, Braunschweig, Germany, Sep. 26-28, 2012, pp. 31-34.
Extended European Search Report dated Jul. 12, 2019 in connection with European Application No. 19168684.9.
English Translation of Brazilian Office Action dated Jul. 14, 2020 in connection with Brazilian Application No. 112018007055.
Chinese Office Action dated Sep. 3, 2020 in connection with Chinese Application No. 201910827384.7, and English translation thereof.
Wang Yulin, Tian Xuelong, Gao Xueli. DSP realization of modified speech enhancement algorithm based on adaptive filters. Computer Engineering and Applications. Jan. 31. 2015 : 208-212. Notice of Grant used as CER.

* cited by examiner

INFORMATION PROCESSING DEVICE

CROSS REFERENCE TO RELATED APPLICATIONS

This application claims the benefit under 35 U.S.C. § 120 as a continuation of U.S. patent application Ser. No. 15/766,241, entitled "INFORMATION PROCESSING DEVICE," filed on Apr. 5, 2018, which claims the benefit under 35 U.S.C. § 371 as a U.S. National Stage Entry of International Application No. PCT/JP2016/079855, filed Oct. 6, 2016, entitled "INFORMATION PROCESSING DEVICE", which claims priority to International Application No. PCT/JP2016/073655, filed Aug. 10, 2016, entitled "INFORMATION PROCESSING DEVICE", which claims priority under 35 U.S.C. § 119(a)-(d) or 35 U.S.C. § 365(b) to Japanese application number 2016-177402, filed Sep. 12, 2016, Japanese application number 2016-133593, filed Jul. 5, 2016, and Japanese application number 2015-201723, filed Oct. 13, 2015, each of which is hereby incorporated by reference in its entirety.

TECHNICAL FIELD

The present disclosure relates to an information processing device.

BACKGROUND ART

In recent years, with advances in communication technologies or miniaturization of various devices, types of devices such as so-called information processing devices have been diversified. The information processing devices are not limited to personal computers (PCs) or the like and information processing devices such as smartphones or tablet terminals which can be carried by users have also been widespread. In particular, so-called wearable devices which can be worn on parts of the bodies of users to be usable while being carried have also recently been proposed.

In addition, in recent years, with development of so-called voice recognition technologies or natural language processing technologies, information processing devices that have user interfaces (UIs) with which users can instruct to execute various processes by voice inputs have also be widespread.

CITATION LIST

Patent Literature

Patent Literature 1: JP-2012-203122A

DISCLOSURE OF INVENTION

Technical Problem

In addition, in information processing devices capable of collecting voices spoken by users for voice recognition, voice calling, and the like, structures capable of further improving sound collection quality by suppressing other acoustic sound (that is, noise) other than collection target voice have been examined. For example, Patent Literature 1 discloses an example of a structure for suppressing noise.

On the other hand, as use scenes of the information processing devices are diversified as in cases or the like in which information processing devices are used outdoors, situations in which surrounding environments of the information processing devices are dynamically changed are assumed. In such situations, cases in which sounds produced from information processing devices, such as wind noise or sounds accompanied by vibration, are collected as noise can also be assumed. Such sounds are noise occurring at random since occurrence locations or occurrence times are irregular.

Accordingly, the present disclosure proposes an information processing device capable of collecting a target sound in a more suitable aspect even under an environment in which noise occurs at random.

Solution to Problem

According to the present disclosure, there is provided an information processing device including: a sound collection unit; and a holding member configured to have a projection portion with a streamline shape in at least a part and hold the sound collection unit so that the sound collection unit is located at a front end or near the front end of the projection portion.

Advantageous Effects of Invention

The present disclosure described above provides an information processing device capable of collecting a target sound in a more suitable aspect even under an environment in which noise occurs at random.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
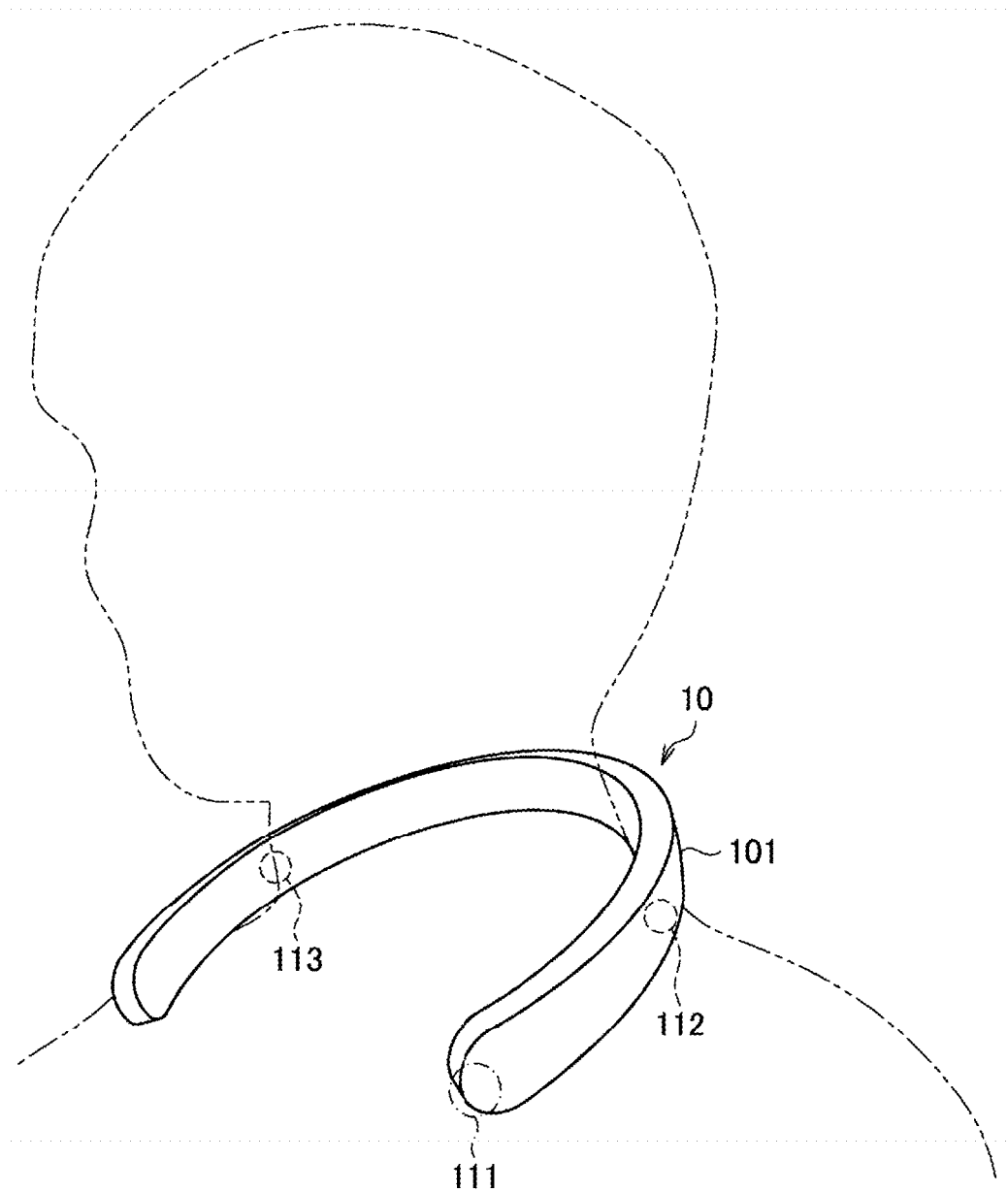
FIG. 1 is an explanatory diagram illustrating an example of a schematic configuration of an information processing device according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, the description will be made in the following order.
1. First embodiment
1.1. Overview
1.2. Examination of installation position of sound collection unit
1.3. Functional configuration
1.4. Process
1.5. Examples
1.5.1. Example 1: example of wearable device worn around neck
1.5.2. Example 2: example of wearable device worn on head
1.5.3. Example 3: application example to portable information terminal
1.5.4. Example 4: application example to watch type wearable device
1.5.5. Example 5: application example to imaging device
2. Second embodiment
2.1. Overview
2.2. Functional configuration
2.3. Details of uncorrelated component power estimation unit
2.4. Details of random noise power estimation unit
2.5. Evaluation
3. Third embodiment
3.1. Overview
3.2. Functional configuration
3.3. Details of method of calculating multichannel Wiener-filter
3.4. Evaluation
4. Hardware configuration
5. Conclusion

1. First Embodiment

<1.1. Overview>

First, an example of a schematic configuration of an information processing device according to a first embodiment of the present disclosure will be described with reference to FIG. 1. Subsequently, a technical problem of the information processing device according to the embodiment will be described. FIG. 1 is an explanatory diagram illustrating an example of a schematic configuration of the information processing device according to the first embodiment of the present disclosure.

In the example illustrated in FIG. 1, an information processing device 10 includes a so-called wearable device. More specifically, the information processing device 10 is formed in a partially opened ring shape (in other words, a headband form or a U-shaped form) and is worn on a user so that at least a part of the inner surface of the ring shape comes into contact with a part of the neck of the user (that is, is hung around the neck).

In addition, the information processing device 10 includes a sound collection unit such as a so-called microphone and collects a voice spoken by the user as acoustic information from the sound collection unit. For example, in the example illustrated in FIG. 1, the information processing device 10 includes a plurality of sound collection units denoted by reference numerals 111 to 113. More specifically, the sound collection units 111 to 113 are held by, for example, a casing 101 of the information processing device 10.

Figure 2:
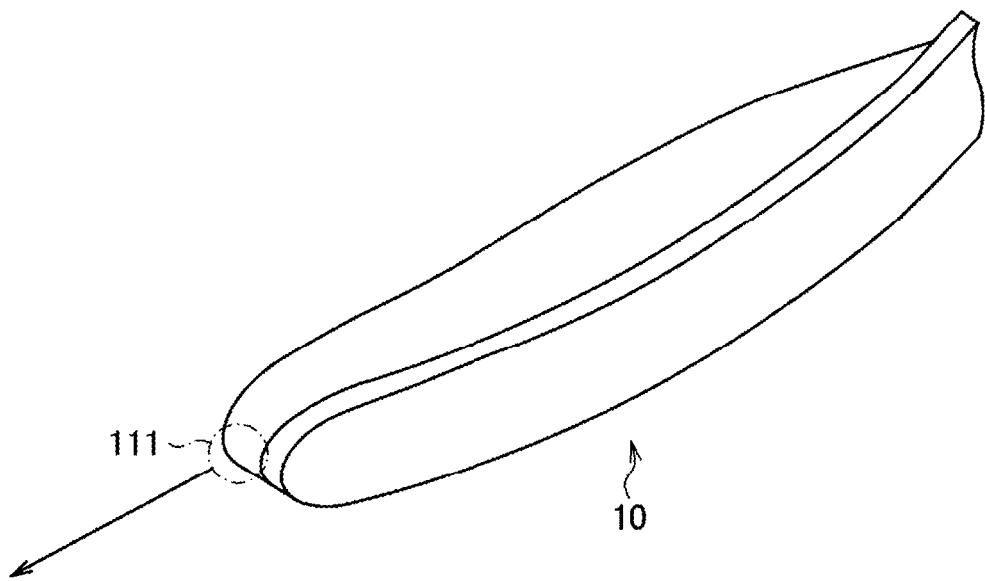
FIG. 2 is an explanatory diagram illustrating an example of the schematic configuration of the information processing device according to the embodiment of the present disclosure.

For example, FIG. 2 is an explanatory diagram illustrating an example of the schematic configuration of the information processing device 10 according to the embodiment and is a diagram illustrating an example of a configuration of a portion in which the sound collection unit 111 is installed in the information processing device 10. As illustrated in FIGS. 1 and 2, when the information processing device 10 is worn on the neck of the user, a projection portion that has a streamline shape and projects toward the front side of the user is installed near the mouth of the user and the sound collection unit 111 is installed at a front end (or near the front end) of the projection portion to face in a direction in which the projection portion projects. In addition, the sound collection unit 111 may be a device separated from the information processing device 10 and may be held at the front end (or near the front end) of the projection portion to face in the direction in which the projection portion projects. Also, in the following description, in a case in which it is described that a sound collection unit 110 is installed in the information processing device 10, a case in which the sound collection unit 110 is separated from the information processing device 10 and is held by at least a part of the information processing device 10 is assumed to be also included.

In addition, as illustrated in FIG. 1, the sound collection units 112 and 113 are installed to face in mutually different directions in the information processing device 10. More specifically, when the information processing device 10 is worn on the neck of the user, the sound collection units 112 and 113 are installed at positions substantially symmetric to each other setting the neck of the user as a reference. Also, the positions at which the sound collection units are installed will be described in detail separately below. In addition, in the example illustrated in FIG. 1, the sound collection units 112 and 113 are installed on the casing 101 with a ring shape to face the outside of the ring (that is, the opposite side to the center of the ring). That is, the sound collection units 112 and 113 are installed to face in the mutually opposite directions.

In the configuration, for example, the information processing device 10 may recognize content spoken by the user by executing analysis based on a voice recognition technology or a natural language processing technology on a voice (acoustic information) of the user collected by the sound collection units (for example, the sound collection units 111 to 113). Thus, for example, the information processing device 10 can recognize instruction content from the user and can execute various processes (applications) in accordance with a recognition result.

In addition, as another example, the information processing device 10 may have a so-called calling function. In this case, the information processing device 10 may transfer the voice collected by the sound collection units (for example, the sound collection units 111 to 113) to another information processing device which is a calling partner.

On the other hand, for example, a situation in which a surrounding environment of the information processing device 10 is dynamically changed in diverse use scenes such as a case in which the information processing device 10, such as a so-called wearable device illustrated in FIG. 1, which can be carried by the user is used outdoors is assumed. In the situation, for example, noise occurring at random, such as a wind sound, noise accompanied by vibration, and a rustle accompanied due to wearing of the device, is collected by the sound collection units of the information processing device 10 in some cases.

Accordingly, in the present disclosure, an installation position of each sound collection unit and an example of signal processing based on a sound collection result obtained by the sound collection units will be described in detail as an example of a structure capable of collecting target sounds in a more suitable aspect even in an environment in which noise occurs at random.

<1.2. Examination of Installation Position of Sound Collection Unit>

First, a result of the examination of the installation positions of the sound collection units capable of collecting a voice of a user in a more suitable aspect in an example of a case in which the information processing device 10 according to the embodiment includes a wearable device worn on the neck of the user, as illustrated in FIG. 1, will be described. More specifically, an example of a measurement result of a wind sound by each of the sound collection units in the information processing device 10 in which the sound collection units are installed at a plurality of spots in a case in which wind arrives at mutually different angles will be described assuming a so-called wind sound as noise.

Figure 3:
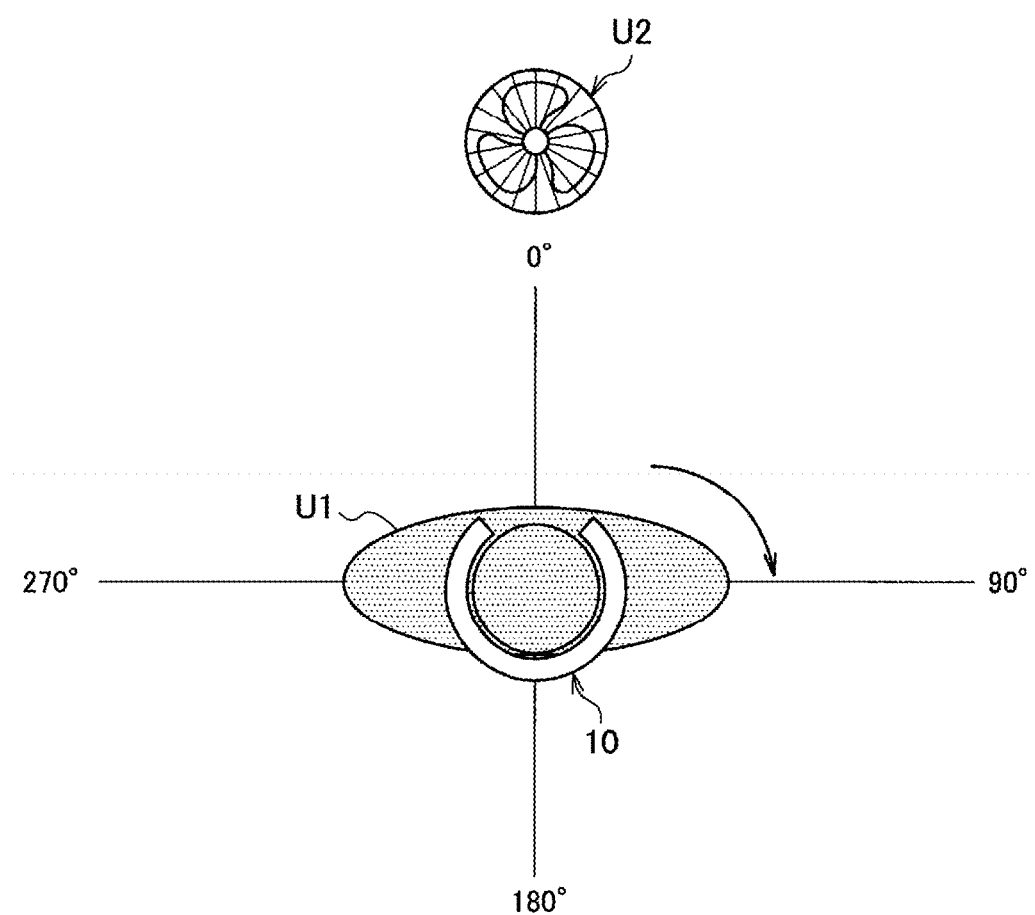
FIG. 3 is an explanatory diagram illustrating an example of a measurement environment in which an influence of a wind sound is measured.

For example, FIG. 3 is an explanatory diagram illustrating an example of a measurement environment in which an influence of a wind sound is measured. In the measurement, as illustrated in FIG. 3, the information processing device 10 is worn around the neck of a dummy doll U1 resembling a part above the chest of the user and a circulator U2 is disposed in front of the dummy doll U1. Then, by setting the vertical direction of the dummy doll U1 as an axis and rotating the dummy doll U1 by 10 degrees within a range of 0 degrees to 360 degrees, an angle at which wind arrives from the circulator U2 to the information processing device 10 is changed and a level of a wind sound collected by each sound collection unit was measured.

Figure 4:
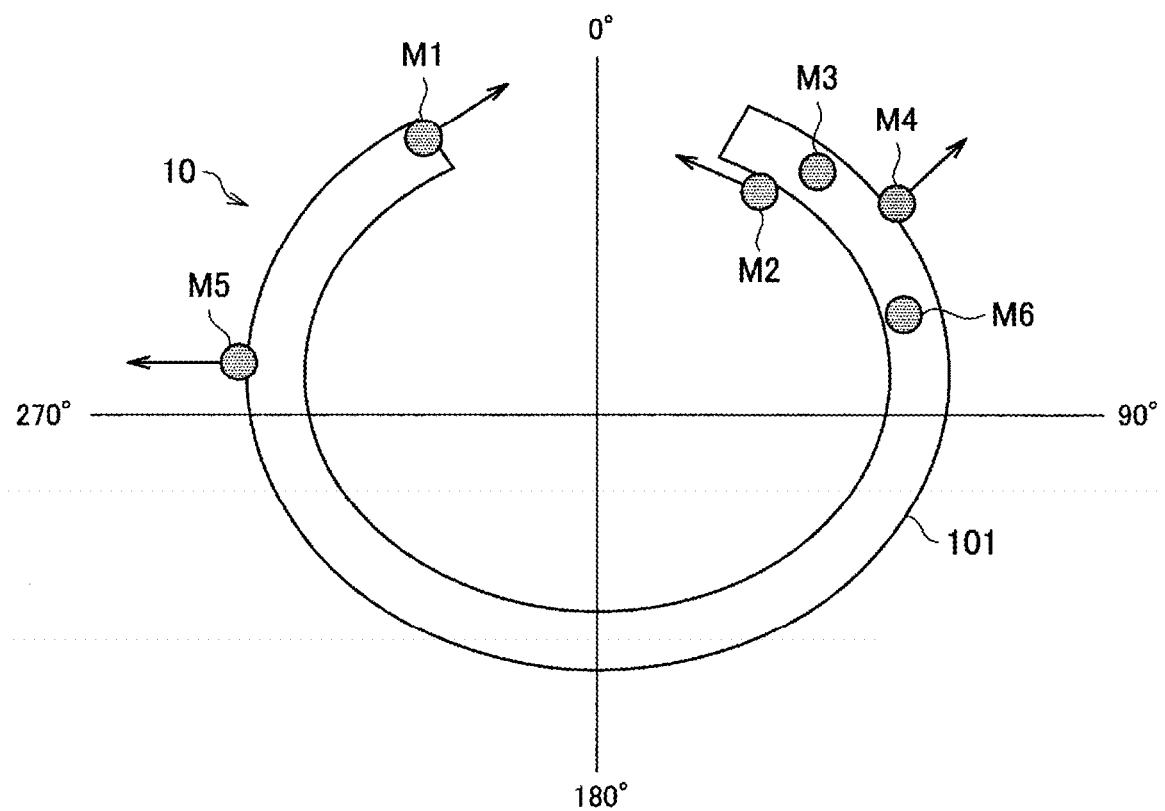
FIG. 4 is a diagram illustrating examples of installation positions of a plurality of sound collection units installed in the information processing device.

FIG. 4 is a diagram illustrating examples of installation positions of the plurality of sound collection units installed in the information processing device 10 in the measurement. Specifically, in an example illustrated in FIG. 4, sound collection units M1 to M6 are installed in the information processing device 10. Markers appended in the information processing device 10 schematically indicate positions at which the sound collection units M1 to M6 are installed. Also, in the markers to which the arrows are appended, the arrows indicate the directions of the sound collection units corresponding to the markers. In addition, for markers to which no arrow is appended, the sound collection units (that is, the sound collection units M3 and M6) corresponding to the markers are assumed to be set to face the upward vertical direction (that is, the near side in the depth direction of the drawing) of the information processing device 10.

Specifically, the sound collection unit M1 is equivalent to the sound collection unit 111 in the information processing device 10 described with reference to FIG. 1. That is, when the information processing device 10 is worn on the user, the sound collection unit M1 is installed at the front end of the projection portion installed to project toward the front side of the user at a position equivalent to the vicinity of the mouth of the user. In addition, the sound collection unit M5 is equivalent to the sound collection unit 112 in the information processing device 10 described with reference to FIG. 1. That is, when the information processing device 10 is worn on the user, the sound collection unit M5 is installed outside of the casing 101 of the information processing device 10 at a position equivalent to the left of the user (the direction of about 270 degrees in FIG. 3) to face the outside of the casing 101 (in other words, the direction of about 270 degrees in FIG. 3).

In addition, when the information processing device 10 is worn on the user, the sound collection units M2 to M4 and M6 are installed at positions equivalent to areas in the right front of the user (in other words, the direction of about 45 degrees in FIG. 3). At this time, the sound collection unit M2 is installed to face the inside of the casing 101 via a space between the casing 101 of the information processing device 10 and the neck of the user. In addition, the sound collection unit M4 is installed on the outside of the casing 101 of the information processing device 10 to face the outside of the casing 101 (in other words, the direction of about 45 degrees in FIG. 3). Also, the sound collection units M3 and M6 are installed to face the upward vertical direction, as described above.

Figure 5:
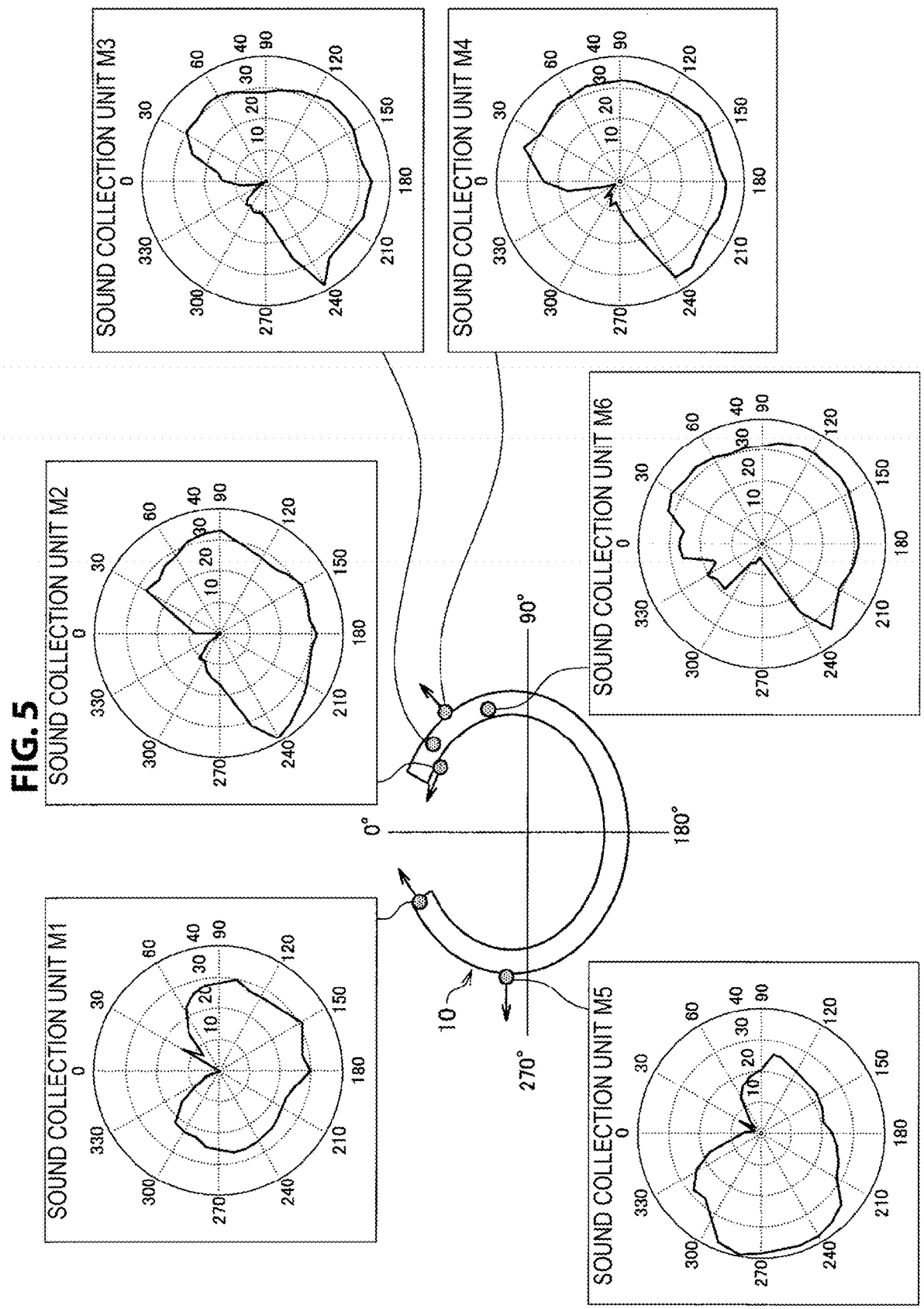
FIG. 5 is an explanatory diagram illustrating examples of measurement results of wind sounds by sound collection units in a case in which wind arrives at different angles in the information processing device.

In addition, FIG. 5 is an explanatory diagram illustrating examples of measurement results of wind sounds by the sound collection units in a case in which wind arrives at different angles in the information processing device 10. That is, FIG. 5 illustrates examples of sound collection results of the wind sounds by the sound collection units M1 to M6 described with reference to FIG. 4 in the measurement environment described with reference to FIG. 3. Also, in graphs showing the sound collection results of the sound collection units M1 to M6, as illustrated in FIG. 5, numerical values written in the circumferential directions indicate directions in which wind arrive from the circulator U2. In addition, numerical values written in the radial directions of the graphs indicate levels of acoustic sounds collected by the corresponding sound collection units (that is, measurement levels of the sound collection units). That is, in the graphs showing the sound collection results of the sound collection units M1 to M6 illustrated in FIG. 5, it is meant that influences of the wind sounds (that is, noise) are smaller as the measurement levels are smaller (in other words, measurement values are located on the inner sides of the graphs).

Here, when the measurement result of the sound collection unit M1 is focused on, particularly, it can be understood that the influence of the wind sound is small in a situation at which the wind arrives from the front side of the user (that is, the direction of 0 degrees). In addition, for the sound collection unit M1, it can be understood that the influence of the wind sound is smaller than in the other sound collection units even in a case in which the wind arrives from a direction other than the front.

From this, for example, it is estimated that an influence of noise occurring at random, such as the wind sound, can be decreased by installing a sound collection unit at the front end (or near the front end) of the streamline projection portion to face in a direction in which the projection portion projects, as in the sound collection unit 111 illustrated in FIG. 1.

In addition, when the measurement results of the sound collection units M5 and M6 are focused on, it can be understood that the influence of the wind sound is small in a case in which the wind arrives from the neck side of the user to the sound collection unit. It is estimated that this is because the wind is blocked by the neck or the head of the user and thus the influence of the wind sound decreases.

From this, for example, it is estimated that characteristics of another sound collection unit (for example, the sound collection unit 111 illustrated in FIG. 1) are compensated for by installing a sound collection unit so that a part (for example, the neck or the head) of the user on which the information processing device 10 is worn can be used as a shield against wind or the like, as in the sound collection units 112 and 113 illustrated in FIG. 1.

The result of the examination of the installation positions of the sound collection units capable of collecting a voice of the user in the more suitable aspect (that is, causing the influence of the noise such as a wind sound to be smaller) in the example of the case in which the information processing device 10 according to the embodiment includes the wearable device worn on the neck of the user has been described above with reference to FIGS. 3 to 5.

<1.3. Functional Configuration>

Figure 6:
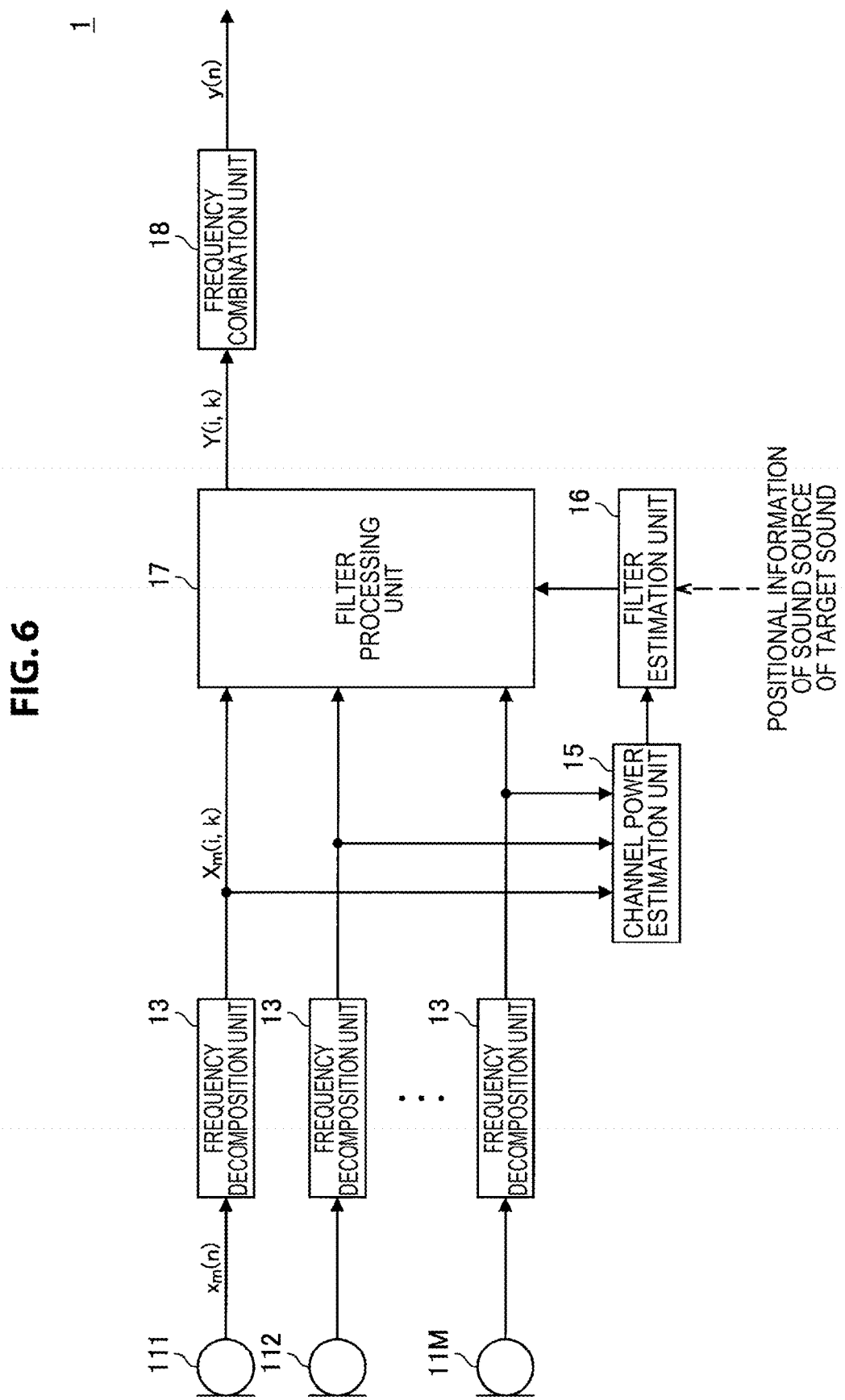
FIG. 6 is a block diagram illustrating an example of a functional configuration of the information processing device according to the embodiment.

Next, an example of a functional configuration of the information processing device 10 according to the embodiment will be described with reference to FIG. 6 particularly by focusing on a process of acquiring a target sound (for example, a voice of a user) on the basis of the sound collection result of each of the plurality of sound collection units in the information processing device 10. FIG. 6 is a block diagram illustrating an example of the functional configuration of the information processing device 10 according to the embodiment.

As illustrated in FIG. 6, the information processing device 10 includes a plurality of sound collection units 111 to 11M (where M is a positive integer), a frequency decomposition unit 13, a channel power estimation unit 15, a filter estimation unit 16, a filter processing unit 17, and a frequency combination unit 18. Also, in the following description, in a case in which the sound collection units 111 to 11M are not particularly distinguished from each other, the sound collection units 111 to 11M are referred to as the "sound collection units 110" in some cases. In addition, the number (that is, M) of sound collection units 110 is not particularly limited as long as the number of sound collection units is plural. The number of sound collection units is preferably 3 or more.

The sound collection unit 110 includes a sound collection device that collects an acoustic sound (that is, an acoustic sound propagating through an external environment and arriving) of the external environment, as in a so-called microphone. Also, a voice input from the user is collected by the sound collection units 110 to be received by the information processing device 10. In addition, for example, the sound collection unit 110 may include a plurality of sound collection devices as in a microphone array. The sound collection unit 110 outputs an acoustic signal based on a sound collection result of the acoustic sound of the external environment to the frequency decomposition unit 13. Also, a gain of an acoustic signal output from the sound collection unit 110 may be adjusted by, for example, an amplifier or the like, the adjusted acoustic signal may be converted from an analog signal to a digital signal through AD conversion, and the digital signal may be input to the frequency decomposition unit 13. Also, in the following description, in a case in which m (where $1 \leq m \leq M$) is a channel number of the sound collection unit 110 and n is a discrete time, an acoustic signal output from the sound collection unit 110 is expressed as $x_m(n)$.

The frequency decomposition unit 13 decomposes the acoustic signal $x_m(n)$ output from the sound collection unit 110 into frequency components and outputs the frequency components. Specifically, the frequency decomposition unit 13 decomposes the acoustic signal $x_m(n)$ into the frequency components by performing processes such as frame partitioning, application of a predetermined window function, time-frequency conversion (for example, Fast Fourier Transform (FFT), Discrete Fourier Transform (DFT), or the like), and the like on the acquired acoustic signal $x_m(n)$. Also, in the following description, the frequency components of the acoustic signal $x_m(n)$ are written as $X_m(i, k)$ in some cases. Here, i indicates a frame number and k indicates a discrete frequency number. Then, the frequency decomposition unit 13 outputs each frequency component $X_m(i, k)$ of the acquired acoustic signal $x_m(n)$ to each of the filter processing unit 17 and the channel power estimation unit 15 located at the rear stage. Thus, in regard to each of the sound collection units 111 to 11M, each frequency component $X_m(i, k)$ of the acoustic signal $x_m(n)$ is output to each of the filter processing unit 17 and the channel power estimation unit 15.

The channel power estimation unit 15 acquires each frequency component $X_m(i, k)$ of the acoustic signal $x_m(n)$ for each sound collection unit 110 (that is, each of the sound collection units 111 to 11M) from the frequency decomposition unit 13. Subsequently, the channel power estimation unit 15 estimates a power spectrum of each sound collection unit 110 for each frequency on the basis of each frequency component $X_m(i, k)$ of the acoustic signal $x_m(n)$ corresponding to each sound collection unit 110. Here, in a case in which $P_m(i, k)$ is a power spectrum corresponding to an i frame and a frequency k in an m-th sound collection unit 110 (that is, a sound collection unit 11m), the power spectrum $P_m(i, k)$ is expressed in a calculation expression indicated below as (Expression 1). Also, in the following (Expression 1), k) indicates a conjugate complex number of k). In addition, in (Expression 1), r is a smoothing coefficient of a frame direction for suppressing an abrupt change in the power spectrum ($0 \leq r < 1$).

[Math. 1]

$$P_m(i,k) = r \cdot P_m(i-1,k) + (1-r) \cdot X_m(i,k) \cdot X_m^*(i,k) \quad \text{(Expression 1)}$$

Then, the channel power estimation unit 15 outputs an estimation result of the power spectrum $P_m(i, k)$ of each sound collection unit 110 to the filter estimation unit 16 for each frequency.

The filter estimation unit 16 calculates a filter coefficient used for the filter processing unit 17 to be described below to execute a filtering process on the basis of the estimation result of the power spectrum $P_m(i, k)$ of each sound collection unit 110 for each frequency output from the channel power estimation unit 15.

Specifically, the filter estimation unit 16 generates a matrix R(i, k) expressed in the following (Expression 2) on the basis of the estimation result of the power spectrum $P_m(i, k)$ of each sound collection unit 110 acquired from the channel power estimation unit 15 for each frequency.

[Math. 2]

$$R(i, k) = \begin{pmatrix} P_1(i, k) & 0 & 0 & 0 \\ 0 & P_2(i, k) & 0 & 0 \\ 0 & 0 & \ddots & 0 \\ 0 & 0 & 0 & P_M(i, k) \end{pmatrix} \quad \text{(Expression 2)}$$

In addition, for each sound collection unit 110, the filter estimation unit 16 calculates an array manifold vector a(k) indicating attenuation and delay characteristics until the sound collection unit 110 for each frequency on a basis of a distance between the sound collection unit 110 and a sound source of a target sound (for example, the mouth or the like of the user). Also, the distance between the sound source of the target sound and each sound collection unit 110 can be specified in advance on a basis of a relative positional relation between the sound source and the information processing device 10 (further, each sound collection unit 110 installed in the information processing device 10) when the information processing device 10 is worn on the user.

Here, the array manifold vector a(k) is expressed in calculation expressions indicated below as (Expression 3) and (Expression 4). Also, in the following calculation expressions, $d_m$ indicates a distance between the sound source (for example, the mouth) of the target sound and an m-th sound collection unit 110 (that is, the sound collection unit 11m). In addition, $g_m$ indicates an attenuation until the target sound arrives at the sound collection unit 11m. In addition, $\omega_k$ indicates an angular frequency corresponding to the discrete frequency number k. In addition, C indicates the sound velocity. In addition, a matrix to which a superscript T is affixed is transposition of the matrix. Also, in the following description, a matrix to which the superscript T is affixed is referred to as a "transposed vector matrix" in some cases.

[Math. 3]

$$a_m(k) = g_m \cdot \exp\left(-j\frac{\omega_k \cdot d_m}{C}\right) \quad \text{(Expression 3)}$$

$$a(k) = [a_1(k), a_2(k), \ldots, a_M(k)]^T \quad \text{(Expression 4)}$$

Then, the filter estimation unit 16 calculates a filter coefficient w(i, k) used for the filter processing unit 17 to be described below to execute the filtering process on the basis of the generated matrix R(i, k), the calculated array manifold vector a(k), and a condition expressed as (Expression 5) below. Here, a matrix to which a superscript H is affixed indicates complex conjugate transposition of the matrix. Also, in the following description, the matrix to which the superscript H is affixed is referred to as a "complex conjugate transposed vector matrix" in some cases.

[Math. 4]

$$\min w(i,k)^H R(i,k) w(i,k) \text{ subject to } w^H(i,k) a(k) = 1 \quad \text{(Expression 5)}$$

The filter coefficient w(i, k) for each frequency is expressed in a calculation expression indicated below as (Expression 6). Also, i indicates a frame number and k indicates a discrete frequency number.

[Math. 5]

$$w(i, k) = \frac{R(i, k)^{-1} a(k)}{a^H(k) R(i, k)^{-1} a(k)} = [w_1(i, k), w_2(i, k), \ldots, w_M(i, k)]^T \quad \text{(Expression 6)}$$

Also, the filter coefficient w(i, k) indicated above as (Expression 6) is a coefficient that maintains the gain of the component a(k) arriving from the sound source (for example, the mouth) of the target sound to 1 and minimizes a noise component (for example, a wind sound or the like), as expressed above in (Expression 5). Then, the filter estimation unit 16 outputs the filter coefficient w(i, k) calculated for each frequency to the filter processing unit 17.

The filter processing unit 17 acquires each frequency component $X_m(i, k)$ of the acoustic signal $x_m(n)$ for each sound collection unit 110 (that is, each of the sound collection units 111 to 11M) from the frequency decomposition unit 13. In addition, the filter processing unit 17 acquires the filter coefficient w(i, k) calculated for each frequency from the filter estimation unit 16. The filter processing unit 17 uses each frequency component $X_m(i, k)$ of the acoustic signal $x_m(n)$ of each sound collection unit 110 as an input signal and generates an output signal Y(i, k) by executing the filtering process based on the acquired filter coefficient w(i, k) for each frequency.

Specifically, the filter processing unit 17 uses each frequency component $X_m(i, k)$ of the acoustic signal $x_m(n)$ of each sound collection unit 110 as an input signal and generates the output signal Y(i, k) for each frequency by executing weighting addition on the input signal on the basis of the acquired filter coefficient w(i, k) for each frequency. For example, the output signal Y(i, k) is expressed in a calculation expression indicated below as (Expression 7). Also, i indicates a frame number and k indicates a discrete frequency number.

[Math. 6]

$$Y(i, k) = \sum_{m=1}^{M} w_m^*(i, k) \cdot X_m(i, k) \quad \text{(Expression 7)}$$

Then, the filter processing unit 17 outputs the output signal Y(i, k) generated for each frequency to the frequency combination unit 18.

The frequency combination unit 18 acquires the output signal Y(i, k) generated for each frequency from the filter processing unit 17. The frequency combination unit 18 generates an acoustic signal y(n) by combining the acquired output signal Y(i, k) for each frequency. That is, the frequency combination unit 18 executes an inverse process to the above-described frequency decomposition unit 13. Specifically, the frequency combination unit 18 generates the acoustic signal y(n) in which the output signal Y(i, k) for each frequency is combined by executing a process such as a frequency-time conversion (for example, inverse FFT (IFFT), inverse DFT (IDFT), or the like), application of a predetermined window function, frame combination, and the like on the output signal Y(i, k) for each frequency.

Figure 7:
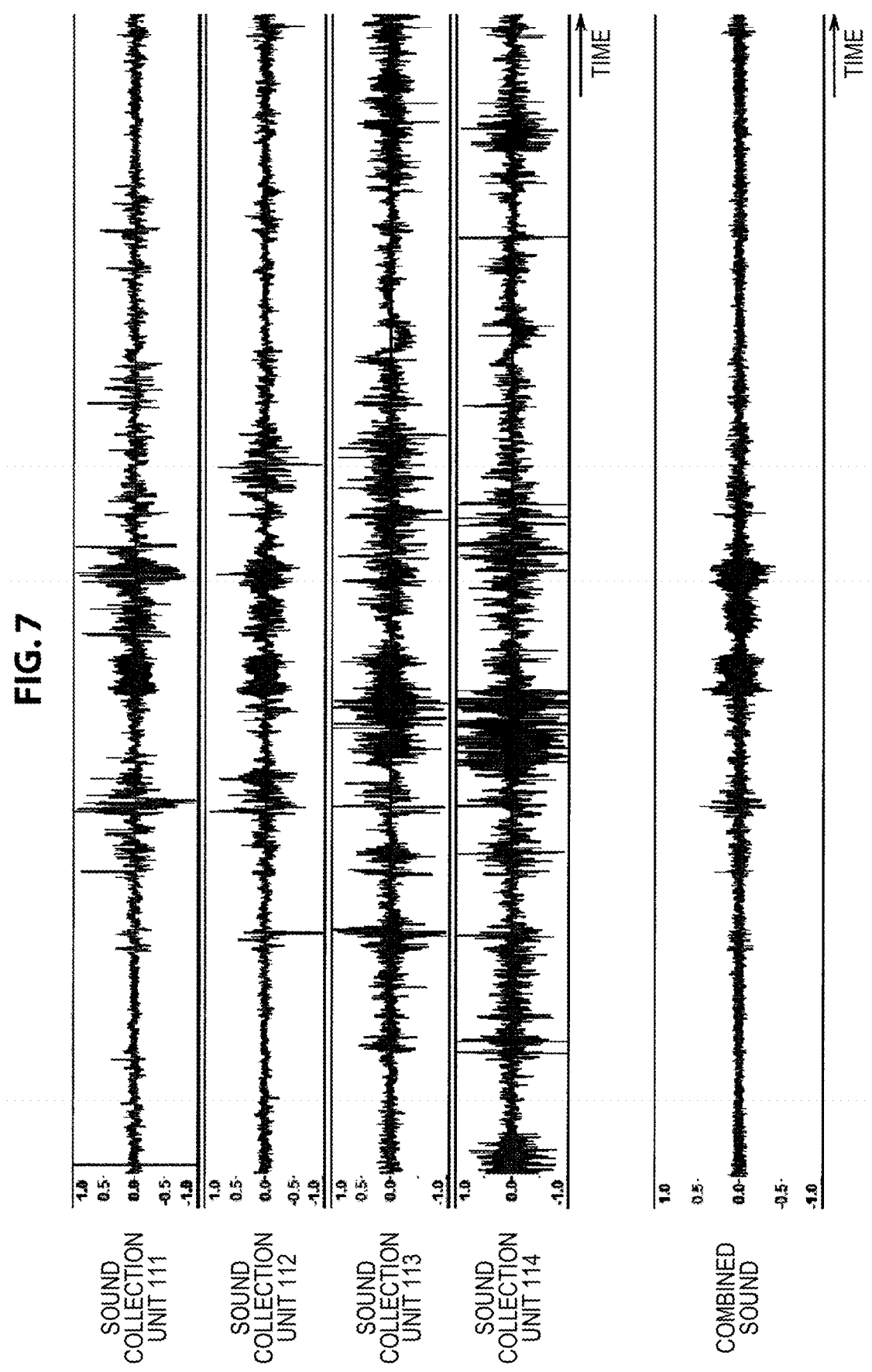
FIG. 7 is a diagram illustrating an example of a process of acquiring a target sound based on a sound collection result of each of the plurality of sound collection units in the information processing device according to the embodiment.

For example, FIG. 7 is a diagram illustrating an example of a process of acquiring a target sound on a basis of a sound collection result of each of the plurality of sound collection units in the information processing device 10 according to the embodiment. The example illustrated in FIG. 7 indicates an example of a case in which four microphones, the sound collection units 111 to 114, are used as the plurality of sound collection units 110. That is, the example illustrated in FIG. 7 indicates examples of sound collection results (that is, collected acoustic signals) by the sound collection units 111 to 114 and an example of an acoustic signal (combined sound) in which the sound collection results of the sound collection units 111 to 114 are combined through signal processing by the information processing device 10.

As described above, the coefficient w(i, k) of the filtering process of combining the sound collection result (more specifically, each frequency component $X_m(i, k)$ of the acoustic signal $x_m(n)$) by each of the plurality of sound collection units 110 has characteristics in which the gain of the component a(k) arriving from the sound source (for example, the mouth) of the target sound is maintained to 1 and a noise component (for example, the wind sound or the like) is minimized. In this configuration, the sound collection result of each sound collection unit 110 is combined so that an input of the sound collection unit 110 for which a level of the noise component is less (in other words, the sound collection unit 110 for which an influence of the noise component is less) is weighted to be further prioritized. Through this process, it is possible to collect the target sound in a more suitable aspect by suppressing the influence of the noise even in an environment in which noise such as a wind sound occurs at random.

Also, as described above, the information processing device 10 according to the embodiment has a configuration in which the target sound is combined from the sound collection results of the plurality of sound collection units 110 and is different from a configuration in which the sound collection unit 110 acquiring a sound collection result is merely switched among the plurality of sound collection units 110. More specifically, in the case of the configuration in which the sound collection unit 110 acquiring the sound collection result is merely switched, an acoustic signal deteriorates before and after the switching in some cases. In particular, the deterioration in the acoustic signal tends to be easily manifest in a situation in which an arriving direction of noise such as a wind sound is dynamically changed. However, the information processing device 10 according to the embodiment combines the target sound through the above-described signal processing. Therefore, even in the situation in which an arriving direction of noise such as a wind sound is dynamically changed, the deterioration in the acoustic signal does not occur and the target sound can be acquired in a more natural form.

Also, the signal processing on the sound collection result of each sound collection unit 110 described above is merely an example and the content of the signal processing is not limited as long as the sound collection result of each sound collection unit 110 can be combined so that an input of the sound collection unit 110 for which the level of the noise component is less is weighted to be further prioritized.

Then, the frequency combination unit 18 outputs the generated acoustic signal y(n) as the sound collection result of the target sound. The acoustic signal y(n) output from the frequency combination unit 18 is used for, for example, various processes (for example, voice recognition, voice calling, and the like) which are executed by the information processing device 10.

Also, the configuration illustrated in FIG. 6 is merely an example and the configuration of the information processing device 10 is not limited to the example illustrated in FIG. 6 as long as the above-described various processes can be realized. For example, in the example illustrated in FIG. 6, the frequency decomposition unit 13 is installed for each of the sound collection units 111 to 11m, but one frequency decomposition unit 13 may process the acoustic signal output from each of the plurality of sound collection units 110. In addition, a part of the configuration may be attached to the outside of the information processing device 10. As a specific example, at least some of the plurality of sound collection units 110 may be detached from and attached to the information processing device 10.

The example of the functional configuration of the information processing device 10 according to the embodiment has been described above with reference to FIGS. 6 and 7 by focusing on the process of acquiring the target sound on the basis of the sound collection result of each of the plurality of sound collection units in the information processing device 10.

<1.4. Process>

Figure 8:
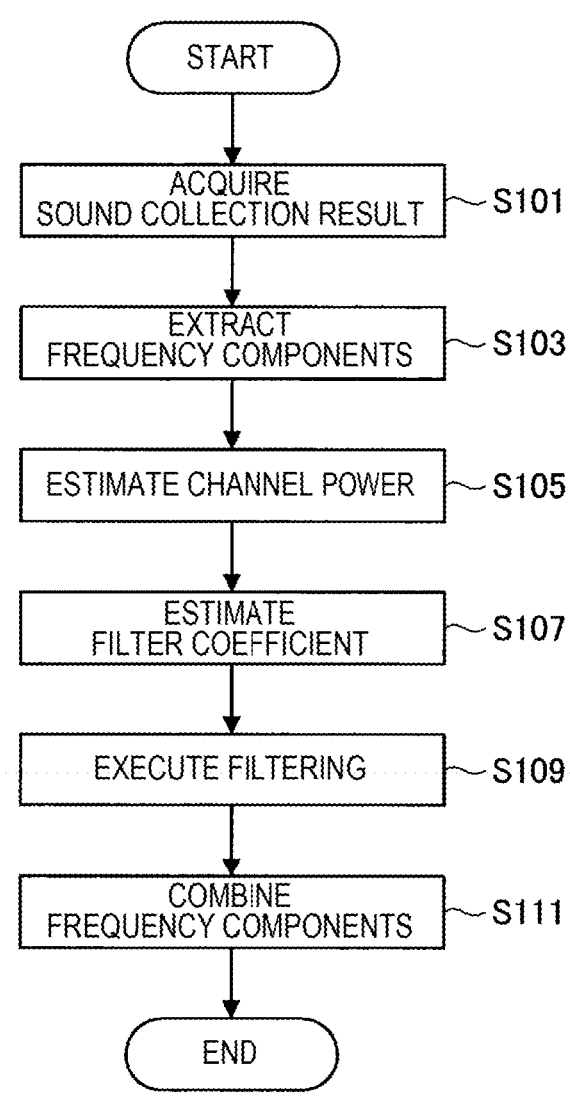
FIG. 8 is a flowchart illustrating an example of a flow of a series of processes of the information processing device according to the embodiment.

Next, an example of a process of a series of processes of the information processing device 10 according to the embodiment will be described with reference to FIG. 8 particularly by focusing on a process of acquiring a target sound (for example, a voice of the user) on the basis of the sound collection result of each of the plurality of sound collection units in the information processing device 10. FIG. 8 is a flowchart illustrating an example of the flow of the series of processes of the information processing device 10 according to the embodiment.

(Step S101)

An acoustic sound of an external environment is collected by the plurality of sound collection units 110 to be received by the information processing device 10. The sound collection units 110 adjusts the gain of the acoustic signal (the analog signal) based on the sound collection result, converts the adjusted acoustic signal from the analog signal to the digital signal through AD conversion, and outputs the converted acoustic signal (the digital signal) $x_m(n)$ to the frequency decomposition unit 13.

(Step S103)

The frequency decomposition unit 13 decomposes the acoustic signal $x_m(n)$ into the frequency components by executing the frame partitioning, the application of the predetermined window function, the time-frequency conversion, and the like on the acoustic signal $x_m(n)$ output from the sound collection units 110. Then, the frequency decomposition unit 13 outputs each frequency component $X_m(i, k)$ of the acoustic signal $x_m(n)$ to each of the filter processing unit 17 and the channel power estimation unit 15 located at the rear stage. Thus, for each of the plurality of sound collection units 110, the frequency component $X_m(i, k)$ of the acoustic signal $x_m(n)$ is output to each of the filter processing unit 17 and the channel power estimation unit 15.

(Step S105)

The channel power estimation unit 15 acquires each frequency component k) of the acoustic signal $x_m(n)$ for each sound collection unit 110 from the frequency decomposition unit 13. Subsequently, the channel power estimation unit 15 estimates the power spectrum of each sound collection unit 110 for each frequency on the basis of the frequency component $X_m(i, k)$ of the acoustic signal $x_m(n)$ corresponding to each sound collection unit 110. Then, the channel power estimation unit 15 outputs the estimation result of the power spectrum $P_m(i, k)$ of each sound collection unit 110 for each frequency to the filter estimation unit 16.

(Step S107)

The filter estimation unit 16 calculates the filter coefficient w(i, k) used for the filter processing unit 17 to be described below to execute the filtering process on the basis of the estimation result of the power spectrum $P_m(i, k)$ of each sound collection unit 110 for each frequency output from the channel power estimation unit 15.

Specifically, the filter estimation unit 16 generates the matrix R(i, k) on the basis of the power spectrum $P_m(i, k)$ of each sound collection unit 110. In addition, for each sound collection unit 110, the filter estimation unit 16 calculates the array manifold vector a(k) indicating attenuation and delay characteristics until the sound collection unit 110 for each frequency on the basis of the distance between the sound collection unit 110 and the sound source of the target sound. Then, the filter estimation unit 16 calculates the filter coefficient w(i, k) on the basis of the generated matrix R(i, k) and the calculated array manifold vector a(k) and outputs the filter coefficient w(i, k) to the filter processing unit 17.

(Step S109)

The filter processing unit 17 acquires each frequency component $X_m(i, k)$ of the acoustic signal $x_m(n)$ for each sound collection unit 110 from the frequency decomposition unit 13. In addition, the filter processing unit 17 acquires the filter coefficient w(i, k) calculated for each frequency from the filter estimation unit 16. The filter processing unit 17 uses each frequency component $X_m(i, k)$ of the acoustic signal $x_m(n)$ of each sound collection unit 110 as an input signal and generates the output signal Y(i, k) for each frequency by executing weighting addition on the input signal on the basis of the acquired filter coefficient w(i, k) for each frequency. Then, the filter processing unit 17 outputs the output signal Y(i, k) generated for each frequency to the frequency combination unit 18.

(Step S111)

The frequency combination unit 18 combines the output signal Y(i, k) for each frequency by executing the processes such as the frequency-time conversion, the application of the predetermined window function, and the frame combination on the output signal Y(i, k) for each frequency output from the filter processing unit 17. Thus, the acoustic signal y(n) in which the sound collection result of each sound collection unit 110 is combined is generated. Also, the acoustic signal y(n) generated by the frequency combination unit 18 is used as the sound collection result for, for example, various processes (for example, voice recognition, voice calling, and the like) which are executed by the information processing device 10.

The example of the process of the series of processes of the information processing device 10 according to the embodiment has been described with reference to FIG. 8 particularly by focusing on the process of acquiring the target sound on the basis of the sound collection result of each of the plurality of sound collection units in the information processing device 10.

1.5. EXAMPLES

Next, other types of information processing device 10 according to the embodiment will be described as examples.

1.5.1. Example 1

Example of Wearable Device Worn Around Neck

First, according to Example 1, examples of the information processing device including a wearable device which can be mounted on the neck of a user, such as a so-called neckband type wearable device illustrated in FIG. 1, will be described with reference to FIGS. 9 to 11.

Figure 9:
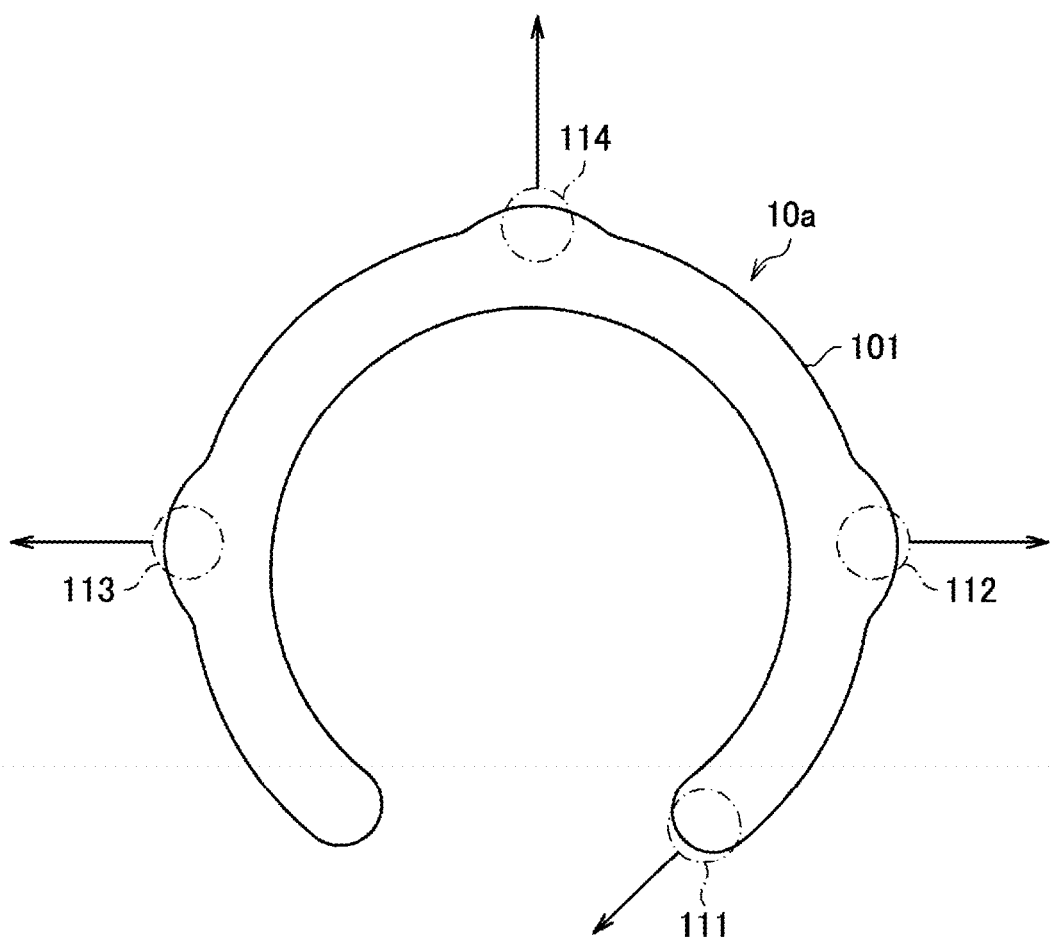
FIG. 9 is an explanatory diagram illustrating an example of an information processing device according to Example 1.

For example, FIG. 9 is an explanatory diagram illustrating an example of the information processing device according to Example 1 and illustrating an example of the information processing device including a wearable device which can be worn on the neck of the user. Also, in the description, the information processing device illustrated in FIG. 9 is referred to as an "information processing device 10a" in some cases to distinguish the information processing device from the information processing device 10 according to the above-described embodiment or information processing devices according to other examples.

As illustrated in FIG. 9, the information processing device 10a includes the sound collection units 111 to 114. The sound collection units 111 to 113 correspond to the sound collection units 111 to 113 of the information processing device 10 described above with reference to FIG. 1. In addition, in a case in which the information processing device 10a is worn on the neck of a user, the sound collection unit 114 is installed to face to the rear side of the user at a position on the rear side of the user. In this configuration, for example, it is possible to further alleviate an influence of noise arriving from the rear side of the user.

In addition, in the information processing device 10a, projection portions with streamline shapes projecting in directions in which the sound collection units 112 to 114 face are installed at positions at which the sound collection units 112 to 114 are installed and the sound collection units 112 to 114 are installed at the front ends of the projection portions. In this configuration, as in the sound collection unit 111, the influence of noise such as a wind sound can be alleviated, and thus the sound collection units 112 to 114 can collect acoustic sounds arriving in the directions in which the projection portions project (that is, the directions in which the sound collection units face) in the more suitable aspect.

Also, the positions at which the projection portions are installed (that is, the positions at which the sound collection units 110 are installed) are not particularly limited. Therefore, for example, the projection portions may be installed at spots at which bulges occur in the casing 101 by installing various circuits such as drivers, a battery, and the like and the sound collection units 110 may be installed at the front ends (or near the front end) of the projection portions.

Figure 10:
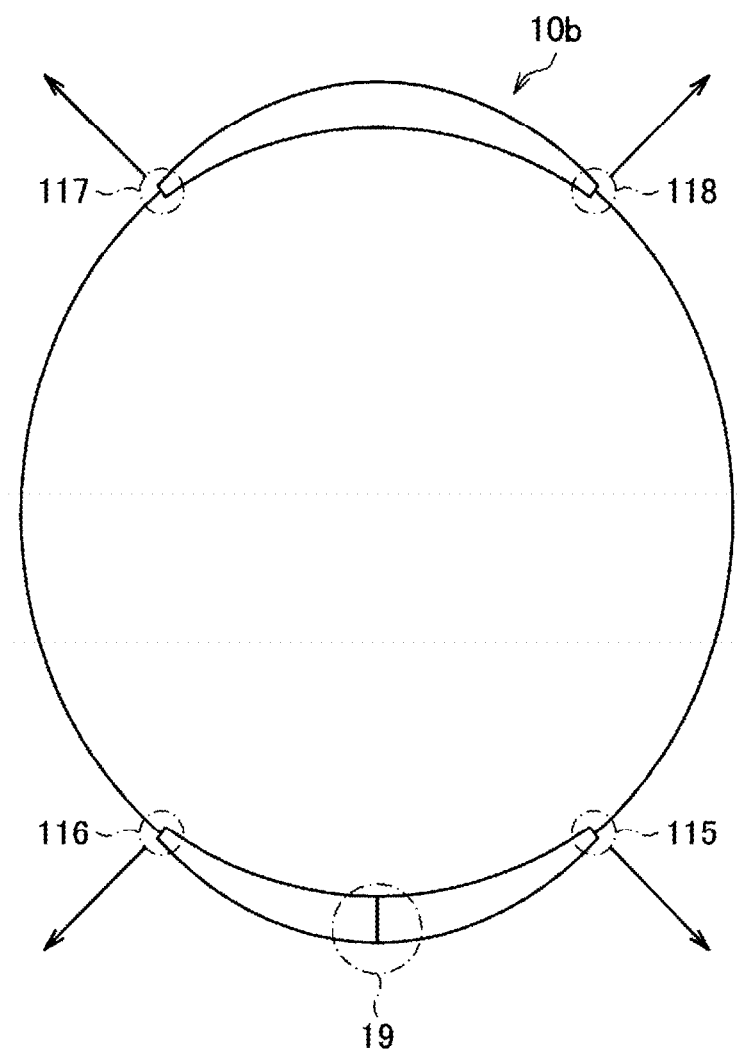
FIG. 10 is an explanatory diagram illustrating another example of the information processing device according to Example 1.

In addition, FIG. 10 is an explanatory diagram illustrating another example of the information processing device according to Example 1 and illustrating an example of the information processing device including a wearable device which can be worn on the neck of the user. Also, in the description, the information processing device illustrated in FIG. 10 is referred to as an "information processing device 10b" in some cases to distinguish the information processing device from the information processing device 10 according to the above-described embodiment or information processing devices according to other examples.

As illustrated in FIG. 10, the information processing device 10b has a ring shape and has a configuration in which a portion denoted by reference numeral 19 can be opened. Also, ends separated from each other by opening the portion denoted by reference numeral 19 can be detached and attached. In this configuration, the information processing device 10b is worn on the user so that the inner surface of the ring portion comes in contact with the neck of the user (that is, is worn around the neck).

In addition, in the information processing device 10b, the sound collection units 115 to 118 are installed to face the outside of the ring (that is, the opposite side to the center of the ring) at mutually different positions along the circumference of the casing formed in the ring form. Also, in the information processing device 10b, the sound collection units 115 to 118 are equivalent to the sound collection units 110 (for example, the sound collection units 111 to 113 or the like illustrated in FIG. 1) according to the above-described embodiment.

In this configuration, for each of the sound collection units 115 to 118, an influence of noise is alleviated since the noise arriving from the opposite sides to the directions in which the sound collection units face are shielded by the part (that is, the neck) of the user on which the information processing device 10b is worn. In particular, in the information processing device 10b illustrated in FIG. 10, the influence of noise (particularly, noise arriving from the neck side of the user) such as a wind sound is further alleviated since each of the sound collection units 115 to 118 is held to be closer to the neck of the user than the information processing device 10 illustrated in FIG. 1. This is also apparent in that an influence of noise arriving from a part side of the user is further alleviated in the sound collection units M5 and M6 (that is, the sound collection units closer to the part of the user), as described with reference to FIG. 5. In addition, since the sound collection units 115 to 118 are installed to face in mutually different directions, for example, it is also possible to compensate for the characteristics of the other sound collection units on the basis of the sound collection results of some of the sound collection units.

Also, even in the information processing device 10b illustrated in FIG. 10, the projection portions with the streamline shape may be installed in at least parts of the casing and the sound collection units 110 (for example, at least some of the sound collection units 115 to 118) may be installed at the front ends (or near the front ends) of the projection portions.

Figure 11:
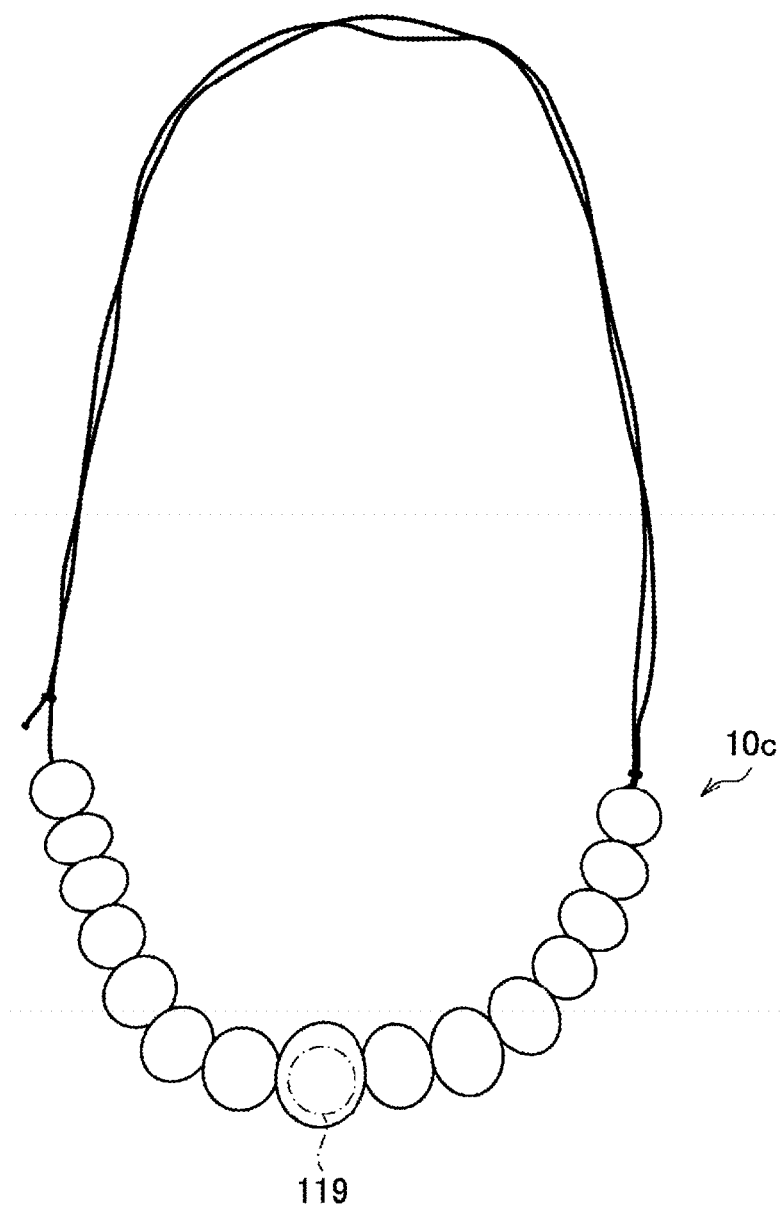
FIG. 11 is an explanatory diagram illustrating another example of the information processing device according to Example 1.

In addition, FIG. 11 is an explanatory diagram illustrating still another example of the information processing device according to Example 1 and illustrating an example of the information processing device including a wearable device which has a so-called necklace shape. Also, in the description, the information processing device illustrated in FIG. 11 is referred to as an "information processing device 10c" in some cases to distinguish the information processing device from the information processing device 10 according to the above-described embodiment or information processing devices according to other examples.

In FIG. 11, reference numeral 119 denotes an example of the sound collection unit 110 of the information processing device 10 according to the above-described embodiment. That is, in the information processing device 10c with the necklace shape, for example, a streamline projection portion may be installed in a portion equivalent to a so-called pendant to face the front side of the user when the user wears the information processing device 10c. A sound collection unit 119 may be installed at the front end (or near the front end) of the projection portion.

Also, in the example illustrated in FIG. 11, one sound collection unit 110 is installed in the information processing device 10c, but the plurality of sound collection units 110 may be installed. In addition, in a case in which the plurality of sound collection units 110 are installed in the information processing device 10c, the plurality of sound collection units 110 may each be installed to face in mutually different directions.

As Example 1, the examples of the information processing device 10 including the wearable device worn on the neck of the user such as the so-called neckband type wearable device illustrated in FIG. 1 have been described above with reference to FIGS. 9 to 11.

1.5.2. Example 2

Example of Wearable Device Worn on Head

Next, according to Example 2, examples of the information processing device including a wearable device which can be worn on a head will be described with reference to FIGS. 12 to 15.

Figure 12:
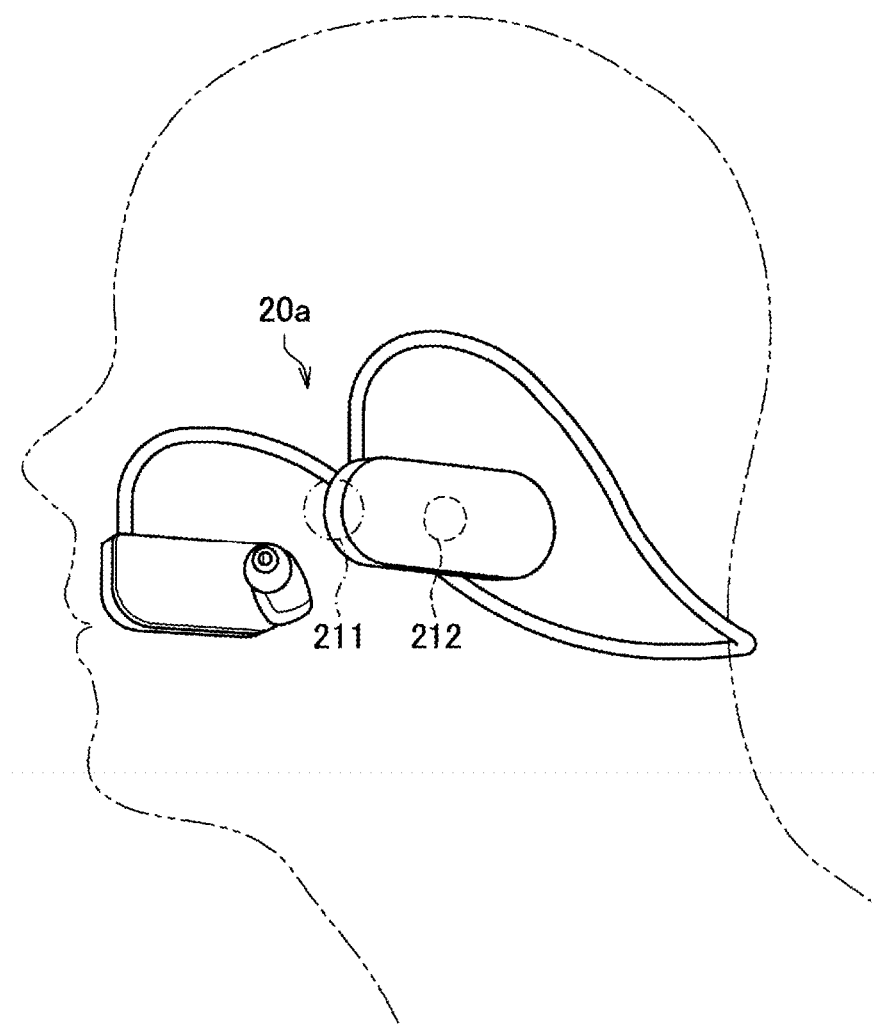
FIG. 12 is an explanatory diagram illustrating an example of an information processing device according to Example 2.

For example, FIG. 12 is an explanatory diagram illustrating an example of the information processing device according to Example 2 and illustrating an example of the information processing device including a wearable device which can be worn on the head of a user. Also, in the description, the information processing device illustrated in FIG. 12 is referred to as an "information processing device 20a" in some cases to distinguish the information processing device from the information processing device 10 according to the above-described embodiment or information processing devices according to other examples.

As illustrated in FIG. 12, when the information processing device 20a is worn on the head of the user, a casing in which a circuit and the like are embedded to realize various functions is held near an ear of the user. As a specific example, in the example illustrated in FIG. 12, the information processing device 20a includes an earphone unit inserted into an ear hole of the user and a holding member that has a cable form and supports the casing when the holding member is hooked on the ear of the user. In the information processing device 20a, the casing is held near the ear of the user by the earphone unit and the holding member with the cable form.

In addition, as illustrated in FIG. 12, the information processing device 20a includes sound collection units 211 and 212. Also, in the information processing device 20a, the sound collection units 211 and 212 are equivalent to the sound collection units 110 (for example, the sound collection units 111 to 113 or the like illustrated in FIG. 1) of the information processing device 10 according to the above-described embodiment.

Specifically, the information processing device 20a has a projection portion with a streamline shape projecting to face in the front side at an end portion of the casing held near the ear of the user and located on the front side of the user in a state in which the information processing device 20a is worn on the head of the user. Then, the sound collection unit 211 is installed at the front end of the projection portion to face in a direction (the front side of the user) in which the projection portion projects. In addition, in a case in which the information processing device 20a is worn on the head of the user, the sound collection unit 212 is installed in at least a part of a side surface located on the outside (that is, the opposite side to the head) of the casing to face in the outside direction (that is, the transverse direction of the user). In addition, the information processing device 20a may include a projection portion with a streamline shape projecting in the outside direction of the casing on a side surface of the casing, and the sound collection unit 212 may be installed at the front end of the projection portion.

Also, the example illustrated in FIG. 12 has been described focusing on the casing held near the left ear of the user, but a casing held near the right ear of the user can also have a similar configuration to the casing held near the left ear. Specifically, the casing held on the right ear may have the configuration equivalent to the sound collection unit 212 or may have the configuration equivalent to the sound collection units 211 and 212.

Figure 13:
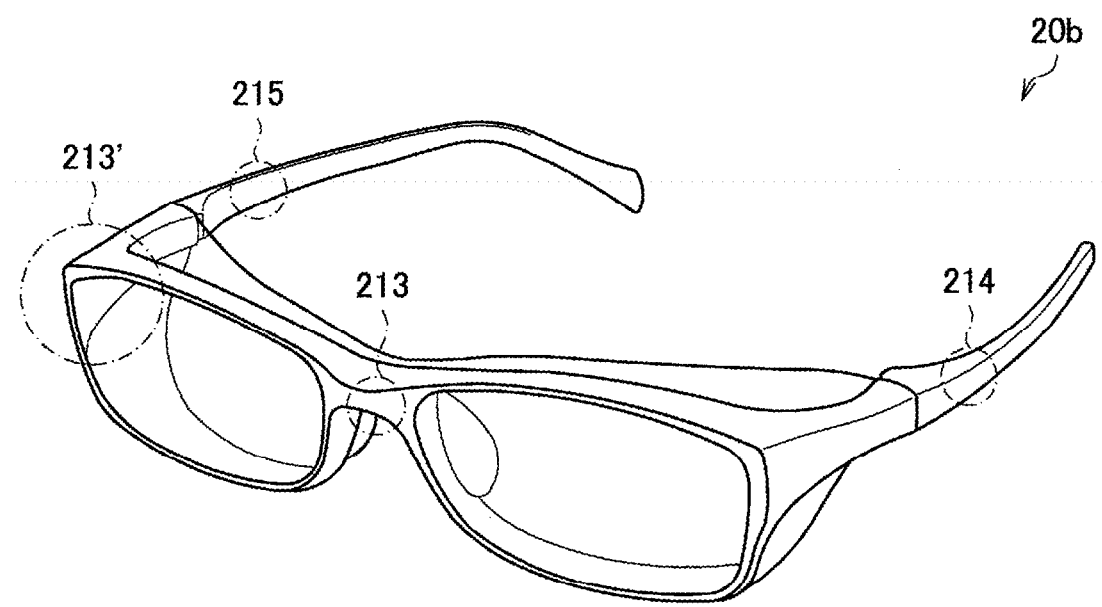
FIG. 13 is an explanatory diagram illustrating another example of the information processing device according to Example 2.

In addition, FIG. 13 is an explanatory diagram illustrating another example of the information processing device according to Example 2 and illustrating an example of the information processing device including a so-called glasses type wearable device which can be worn on the head of the user. Also, in the description, the information processing device illustrated in FIG. 13 is referred to as an "information processing device 20b" in some cases to distinguish the information processing device from the information processing device 10 according to the above-described embodiment or information processing devices according to other examples.

As illustrated in FIG. 13, the information processing device 20b include sound collection units 213 to 215. Also, in the information processing device 20b, the sound collection units 213 to 215 are equivalent to the sound collection units 110 (for example, the sound collection units 111 to 113 or the like illustrated in FIG. 1) of the information processing device 10 according to the above-described embodiment.

For example, in the information processing device 20b, the sound collection unit 213 is installed in at least a part of a portion equivalent to the front of glasses. As a more specific example, the information processing device 20b includes a projection portion with a streamline shape projecting on the front side in a portion equivalent to a bridge of the glasses, and the sound collection unit 213 is installed at the front end of the projection portion to face in a direction in which the projection portion projects. In addition, as another example, as denoted by reference numeral 213', the projection portion and the sound collection unit may be installed in another portion different from a portion equivalent to the bridge in the portion equivalent to the front of the glasses.

In addition, in the information processing device 20b, the sound collection units 214 and 215 are installed in at least parts of portions equivalent to temples of the glasses. Also, for example, in a case in which the information processing device 20b is worn on the head of the user, the sound collection units 214 and 215 may be installed to face in the direction of the opposite side to the head (the transverse direction of the user).

Figure 14:
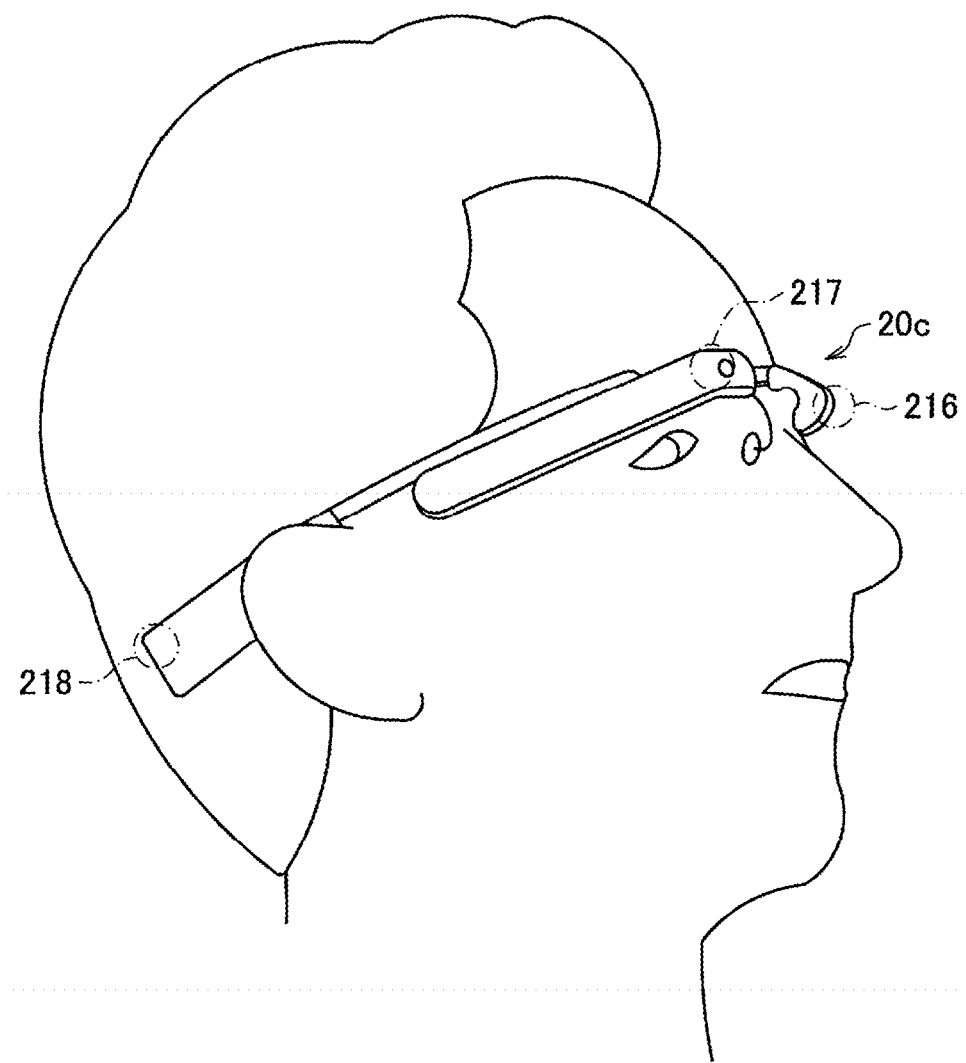
FIG. 14 is an explanatory diagram illustrating another example of the information processing device according to Example 2.

In addition, FIG. 14 is an explanatory diagram illustrating still another example of the information processing device according to Example 2 and illustrating another example of the information processing device including a wearable device which can be worn on the head of the user. Also, in the description, the information processing device illustrated in FIG. 14 is referred to as an "information processing device 20c" in some cases to distinguish the information processing device from the information processing device 10 according to the above-described embodiment or information processing devices according to other examples.

As illustrated in FIG. 14, the information processing device 20c includes sound collection units 216 to 218. Also, in the information processing device 20c, the sound collection units 216 to 218 are equivalent to the sound collection units 110 (for example, the sound collection units 111 to 113 or the like illustrated in FIG. 1) of the information processing device 10 according to the above-described embodiment.

More specifically, the sound collection units 216 to 218 are installed at mutually different positions of portions (for example, the front and temples) equivalent to the frame of the glasses to face in mutually different directions. More specifically, in a case in which the information processing device 20c is worn on the head of the user, the sound collection units 216 to 218 are installed to face the direction of the opposite side to the head.

In this configuration, for each of the sound collection units 216 to 218, an influence of noise is alleviated since the noise arriving from the opposite sides to the directions in which the sound collection units face are shielded by the head of the user. In addition, since the sound collection units 216 to 218 are installed to face in mutually different directions, for example, it is also possible to compensate for the characteristics of the other sound collection units on the basis of the sound collection results of some of the sound collection units.

Figure 15:
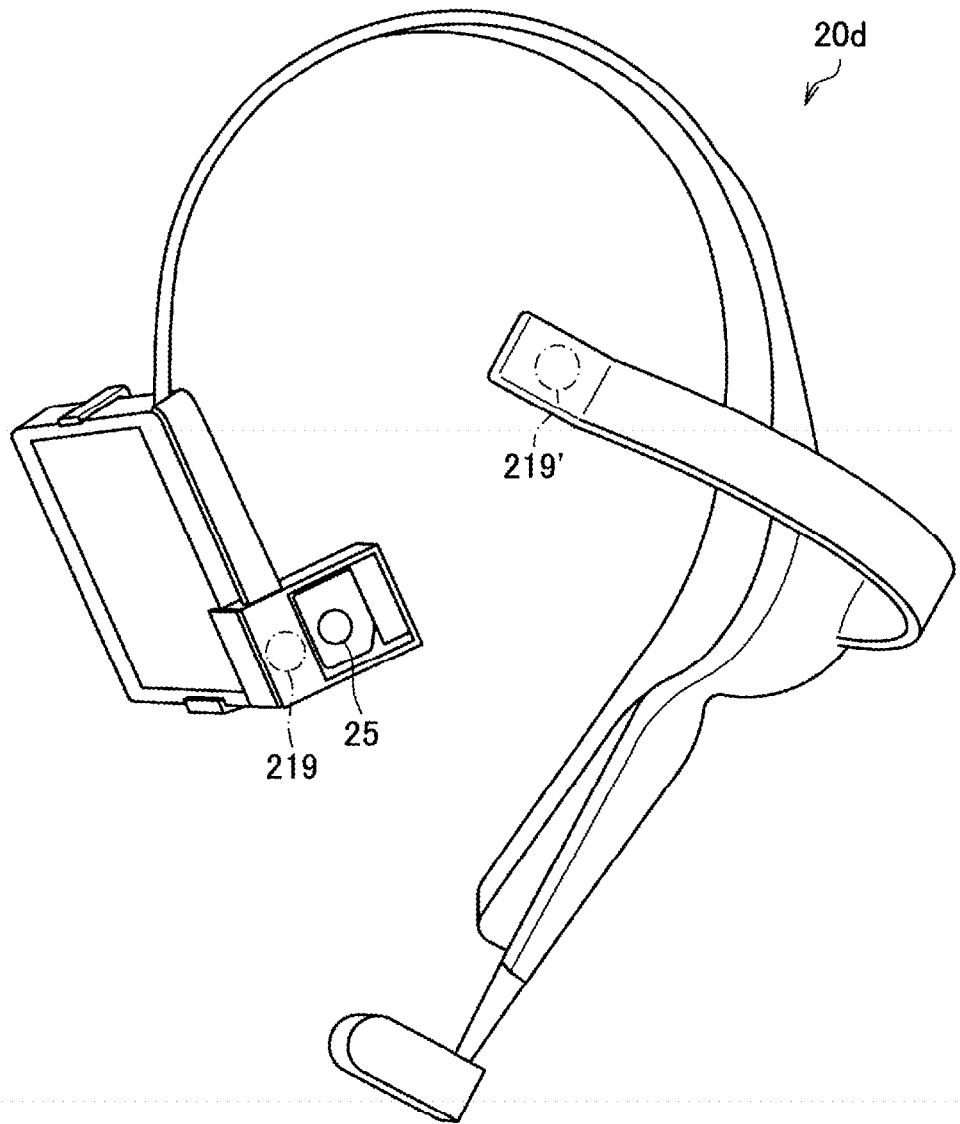
FIG. 15 is an explanatory diagram illustrating another example of the information processing device according to Example 2.

In addition, FIG. 15 is an explanatory diagram illustrating still another example of the information processing device according to Example 2 and illustrating an example of the information processing device including an overhead type wearable device such as a so-called headphone. Also, in the description, the information processing device illustrated in FIG. 15 is referred to as an "information processing device 20d" in some cases to distinguish the information processing device from the information processing device 10 according to the above-described embodiment or information processing devices according to other examples.

In the example illustrated in FIG. 15, the information processing device 20d includes an imaging unit 25 and a sound collection unit 219. Also, in the information processing device 20d, the sound collection unit 219 is equivalent to the sound collection units 110 (for example, the sound collection units 111 to 113 or the like illustrated in FIG. 1) of the information processing device 10 according to the above-described embodiment.

Specifically, in a case in which the information processing device 20d is worn on the head of the user, the imaging unit 25 is installed at a position at which the front side of the user is within an angle of view in a casing of the information processing device 20d. For example, in the example illustrated in FIG. 15, the imaging unit 25 is installed on the casing of the information processing device 20d to face the front side of the user.

In addition, the information processing device 20d has a projection portion with a streamline shape projecting on the front side of the user in at least a part of the casing in a state in which the information processing device 20d is worn on the head of the user, and the sound collection unit 219 is installed at the front end of the projection portion to face in a direction in which the projection portion projects. For example, in the example illustrated in FIG. 15, the sound collection unit 219 is installed near the imaging unit 25. In addition, as another example, as denoted by reference numeral 219', the projection portion with the streamline shape projecting to face on the front side of the user may be installed in at least a part of the holding member that holds the information processing device 20d on the head of the user, the sound collection unit may be installed at the front end of the projection portion to face in the direction in which the projection portion projects.

As Example 2, the examples of the information processing device including the wearable device which can be worn on the head have been described above with reference to FIGS. 12 to 15. Also, the above-described examples are merely examples and the present disclosure is not necessarily limited to the foregoing examples. As a specific example, the information processing device including the head-mounted wearable device with a so-called headband shape may have a configuration equivalent to the sound collection units 110 of the information processing device 10 according to the above-described embodiment.

1.5.3. Example 3

Application Example to Portable Information Terminal

Next, according to Example 3, an example of an information processing device including a portable information terminal such as a so-called smartphone will be described with reference to FIGS. 16 and 17.

Figure 16:
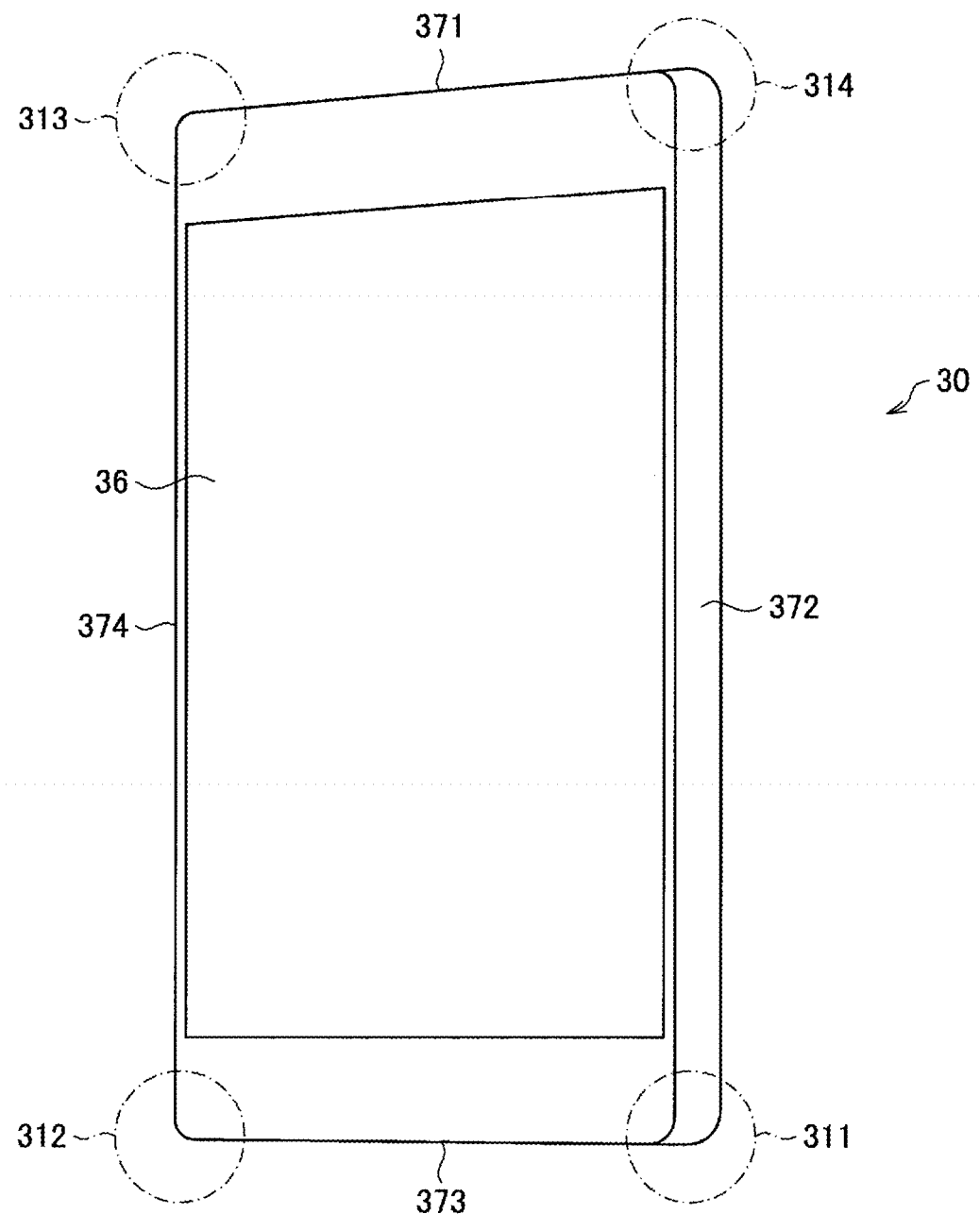
FIG. 16 is an explanatory diagram illustrating an example of the information processing device according to Example 3.

For example, FIG. 16 is an explanatory diagram illustrating an example of the information processing device according to Example 3. Also, in the description, the information processing device illustrated in FIG. 16 is referred to as an "information processing device 30" in some cases to distinguish the information processing device from the information processing device 10 according to the above-described embodiment or information processing devices according to other examples.

As illustrated in FIG. 16, the information processing device 30 includes sound collection units 311 to 314. Also, in the information processing device 30, the sound collection units 311 to 314 are equivalent to the sound collection units 110 (for example, the sound collection units 111 to 113 or the like illustrated in FIG. 1) of the information processing device 10 according to the above-described embodiment.

Specifically, a casing of the information processing device 30 has a substantially rectangular surface 36 in at least a part, and projection portions with streamline shapes are formed in predetermined regions including corners of the surface 36 (that is, the corners or near the corners) to face the outside of the casing. In other words, the casing of the information processing device 30 has the substantially planar surface 36 and a plurality of side surfaces 371 to 374 formed to face different directions along the end portions of the surface 36, and the projection portions with the streamline shape in predetermined regions including portions in which the side surfaces are connected. Also, the surface 36 can be equivalent to, for example, a surface on which a display unit such as a display is installed. In addition, the corners of the casing of the information processing device 30 may be the projection portions. Then, each of the sound collection units 311 to 314 is installed at one front end (or near the front end) of the projection portions to face the outside of the casing of the information processing device 30.

Figure 17:
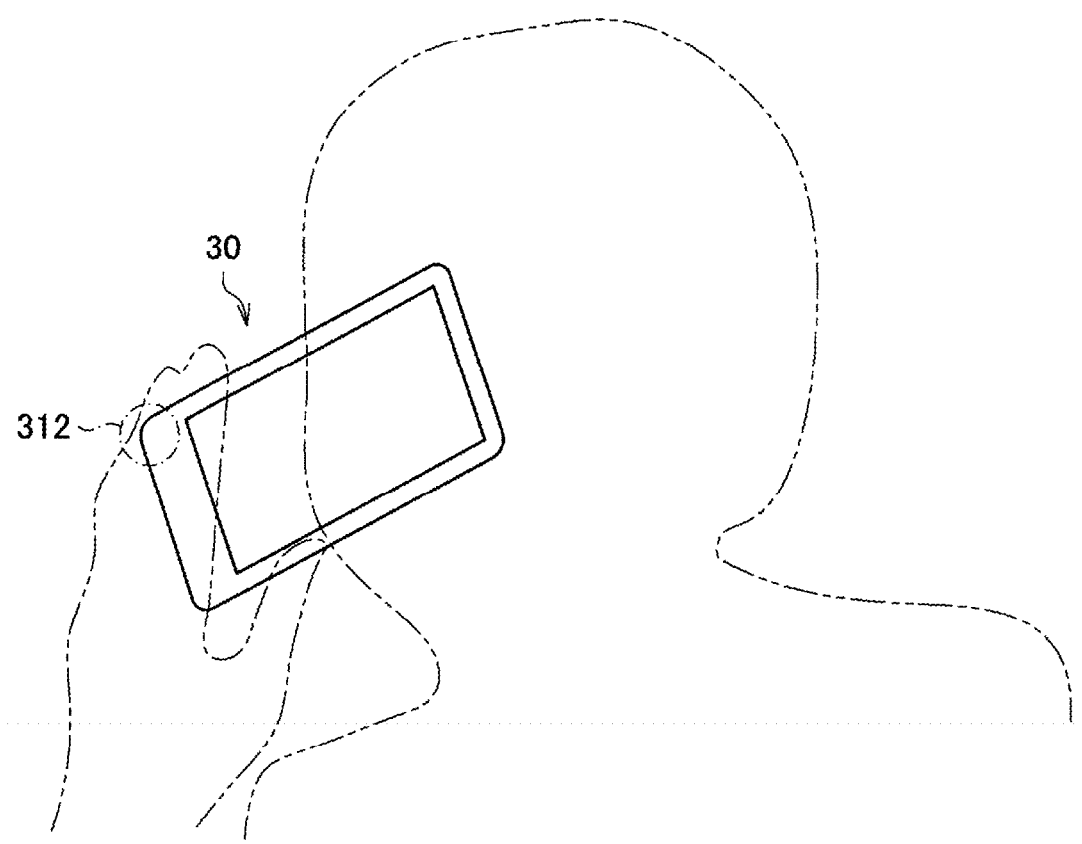
FIG. 17 is an explanatory diagram illustrating an example of a use form of the information processing device 30 according to Modification Example 3.

In addition, FIG. 17 is an explanatory diagram illustrating an example of a use form of the information processing device 30 according to Modification Example 3 and illustrating an example of a case in which a user executes voice calling using the information processing device 30.

As illustrated in FIG. 17, for example, in a case in which the user executes the voice calling while holding the information processing device 30 near the right ear of the user, the information processing device 30 is held so that the sound collection unit 312 faces the substantially front side of the user. In this configuration, for example, in a situation in which the user executes the voice calling while moving, the sound collection unit 312 rarely receives an influence of a wind sound accompanied by wind arriving from the front side due to the movement of the user. Also, a case in which the user executes voice calling while holding the information processing device 30 near the left ear of the user can also be assumed. In this case, the information processing device 30 is held so that the sound collection 311 faces the substantially front side of the user, and thus the sound collection unit 311 rarely receives an influence of a wind sound accompanied by wind arriving from the front side due to the movement of the user. That is, the information processing device 30 can alleviate the influence of the wind sound accompanied by the wind arriving from the front side due to the movement of the user on the basis of the above-described configuration.

In addition, in the information processing device 30, the sound collection units 311 to 314 are installed to face in mutually different directions. In this configuration, the information processing device 30 can compensate for characteristics of the other sound collection units on the basis of the sound collection results of at least some of the sound collection units.

As Example 3, the examples of the information processing device including the portable information terminal such as a so-called smartphone have been described above with reference to FIGS. 16 and 17.

1.5.4. Example 4

Application Example to Watch Type Wearable Device

Next, according to Example 4, examples of the information processing device including a so-called watch type wearable device which can be worn on an arm will be described with reference to FIGS. 18 and 19.

Figure 18:
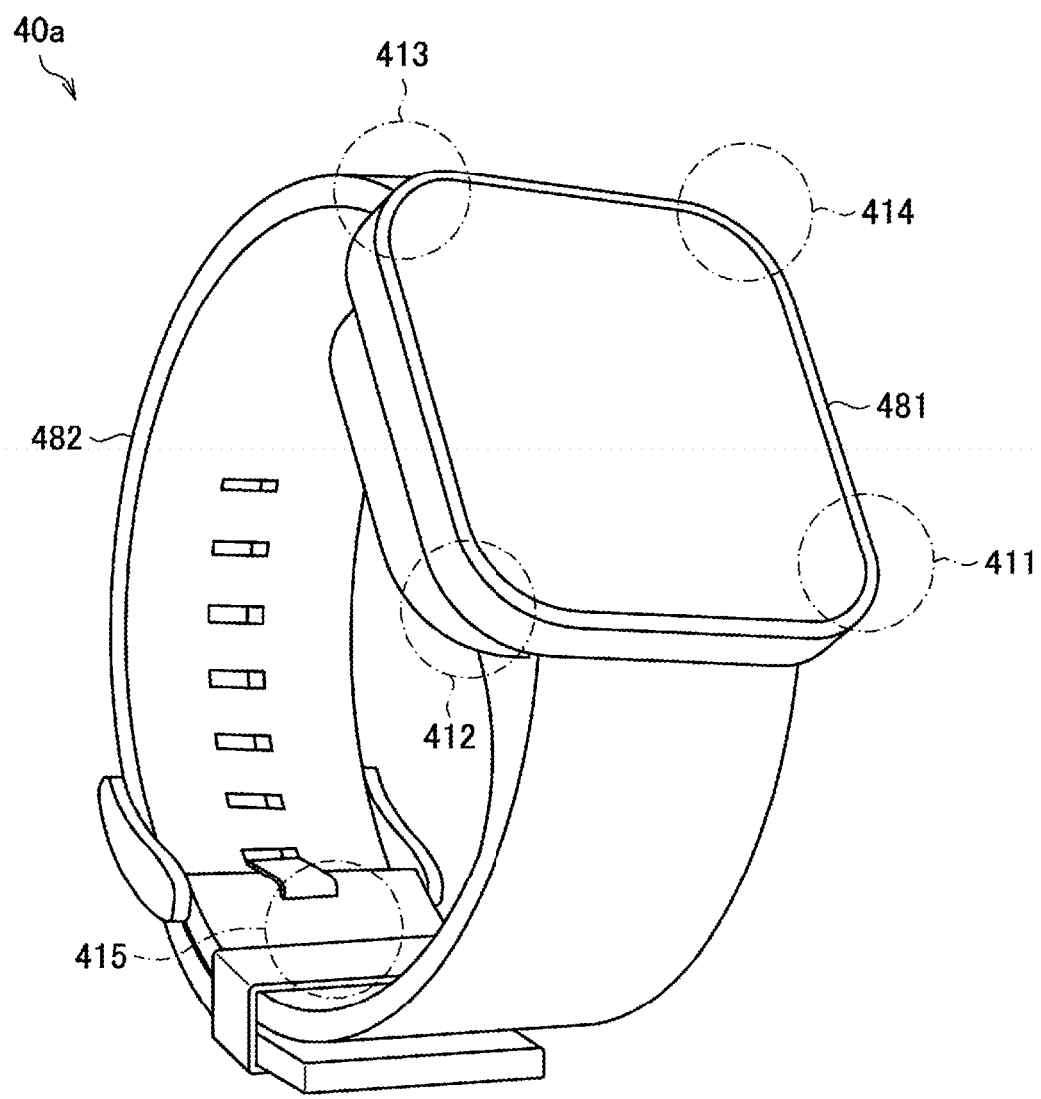
FIG. 18 is an explanatory diagram illustrating an example of an information processing device according to Example 4.

For example, FIG. 18 is an explanatory diagram illustrating an example of an information processing device according to Example 4. Also, in the description, the information processing device illustrated in FIG. 18 is referred to as an "information processing device 40a" in some cases to distinguish the information processing device from the information processing device 10 according to the above-described embodiment or information processing devices according to other examples.

As illustrated in FIG. 18, the information processing device 40a includes sound collection units 411 to 415. Also, in the information processing device 30, the sound collection units 411 to 415 are equivalent to the sound collection units 110 (for example, the sound collection units 111 to 113 or the like illustrated in FIG. 1) of the information processing device 10 according to the above-described embodiment.

Specifically, the information processing device 40a includes a casing 481 in which circuits and the like are embedded to realize various functions and a holding member 482 with a belt shape holding the casing 481 on the arm of the user. The casing 481 has a substantially rectangular surface in at least a part, and projection portions with streamline shapes are formed in predetermined regions including corners of the substantially rectangular surface to face the outside of the casing 481 as in the information processing device 30 according to the above-described Example 3. Also, the substantially rectangular surface is equivalent to a surface on a side on which a dial plate of a so-called watch is installed. Then, each of the sound collection units 411 to 414 is installed at one front end (or near the front end) of the projection portions to face the outside of the casing 481.

In addition, in the holding member 482, a sound collection unit 415 is installed at a position substantially symmetric to the casing 481 setting the arm as a reference to face in the direction of the opposite side to the arm in a state in which the information processing device 40a is worn on the arm.

In this configuration, at least one of the sound collection units 411 to 414 of the information processing device 40a faces in substantially the same direction as an arm swing direction, for example, even in a situation in which the user swings his or her arm on which the information processing device 40a is worn. Therefore, the information processing device 40a can alleviate an influence of a wind sound accompanied by the swing of the arm in accordance with sound collection results by the sound collection units 411 to 414. In addition, in the information processing device 40a, the sound collection units 411 to 415 are installed to face in mutually different directions. In particular, for the sound collection unit 415, noise arriving from the opposite side to the direction in which the sound collection unit 415 faces is shielded by the arm on which the information processing device 40a is worn. In this configuration, the information processing device 40a can also compensate characteristics of the other sound collection units on the basis of the sound collection results of at least some sound collection units among the sound collection units 411 to 415.

Figure 19:
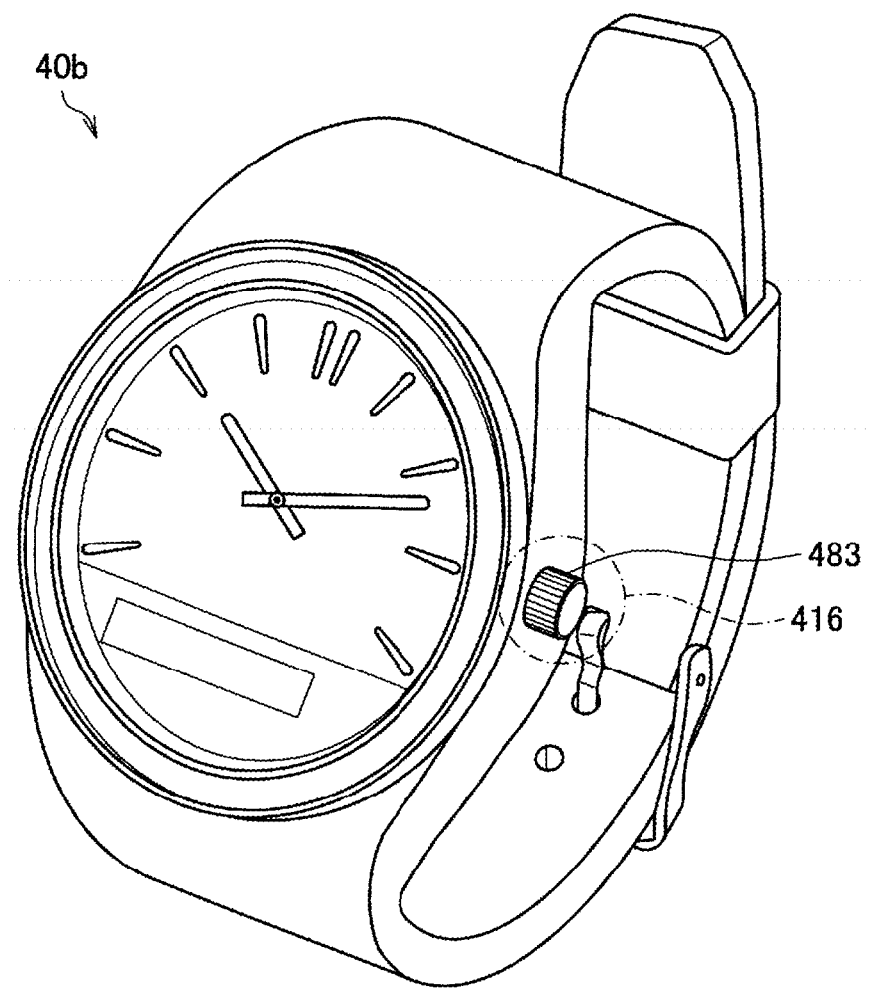
FIG. 19 is an explanatory diagram illustrating another example of the information processing device according to Example 4.

In addition, FIG. 19 is an explanatory diagram illustrating another example of the information processing device according to Example 4. Also, in the description, the information processing device illustrated in FIG. 19 is referred to as an "information processing device 40b" in some cases to distinguish the information processing device from the information processing device 10 according to the above-described embodiment or information processing devices according to other examples.

As illustrated in FIG. 19, the information processing device 40b includes a sound collection unit 416 in a portion equivalent to a screw portion of a so-called watch denoted by reference numeral 483 (hereinafter referred to as a "screw portion 483"). Specifically, by forming the screw portion 483 in a streamline shape, the screw portion 483 may be used as a projection portion in which the sound collection unit 416 is installed. Also, in the information processing device 40b, the sound collection unit 416 is equivalent to the sound collection units 110 (for example, the sound collection unit 111) of the information processing device 10 according to the above-described embodiment.

As Example 4, the examples of the information processing device including the so-called watch type wearable device which can be worn on the arm have been described above with reference to FIGS. 18 and 19.

1.5.5. Example 5

Application Example to Imaging Device

Next, according to Example 5, examples of an information processing device including an imaging device capable of capturing a moving image or a still image will be described with reference to FIGS. 20 and 21.

Figure 20:
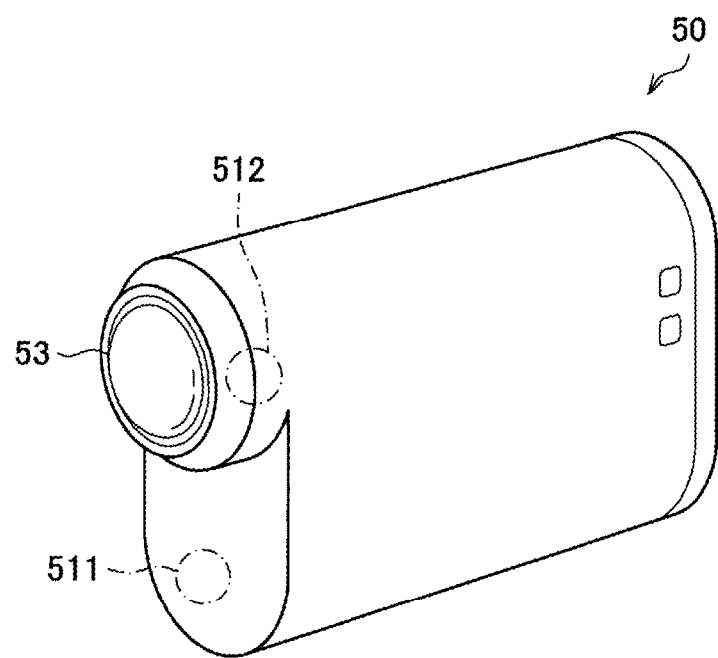
FIG. 20 is an explanatory diagram illustrating an example of an information processing device according to Example 5.

For example, FIG. 20 is an explanatory diagram illustrating an example of an information processing device according to Example 5. Also, in the description, the information processing device illustrated in FIG. 20 is referred to as an "information processing device 50" in some cases to distinguish the information processing device from the information processing device 10 according to the above-described embodiment or information processing devices according to other examples.

In FIG. 20, reference numeral 53 denotes an imaging unit that captures an image such as a moving image or a still image. In addition, reference numerals 511 and 512 denote examples of sound collection units installed in the information processing device 50. Also, in the information processing device 50, the sound collection units 511 and 512 are equivalent to the sound collection units 110 (for example, the sound collection units 111 to 113 or the like illustrated in FIG. 1) of the information processing device 10 according to the above-described embodiment.

Specifically, as illustrated in FIG. 20, the information processing device 50 includes, for example, a projection portion with a streamline shape projecting in a direction in which the imaging unit 53 captures an image (hereinafter also referred to as an "imaging direction") in a part of a surface which is a surface of the casing holding the imaging unit 53 and faces in the imaging direction. Then, the sound collection unit 511 is installed at the front end (or near the front end) of the projection portion to face in the imaging direction (in other words, the front side) of the imaging unit 53.

In addition, the sound collection unit 512 may be installed near the imaging unit 53 (for example, near a lens of the imaging unit 53). For example, FIG. 21 is an explanatory diagram illustrating an example of a schematic configuration near of the lens of the imaging unit 53 in the information processing device 50 according to Example 5. In the example illustrated in FIG. 21, in the information processing device 50, a projection portion 551 projecting toward the outside of the casing of the information processing device 50 is installed near the lens of the imaging unit 53. In addition, the projection portion 551 includes a projection portion 553 with a streamline shape projecting in the imaging direction (that is, the front side) of the imaging unit 53, and the sound collection unit 513 is installed at the front end (or near the front end) of the projection portion 553.

In this configuration, the information processing device 50 can alleviate an influence of a wind sound accompanied by wind arriving from the front side due to movement of a user, for example, even in a situation in which the user captures an image while moving.

Figure 21:
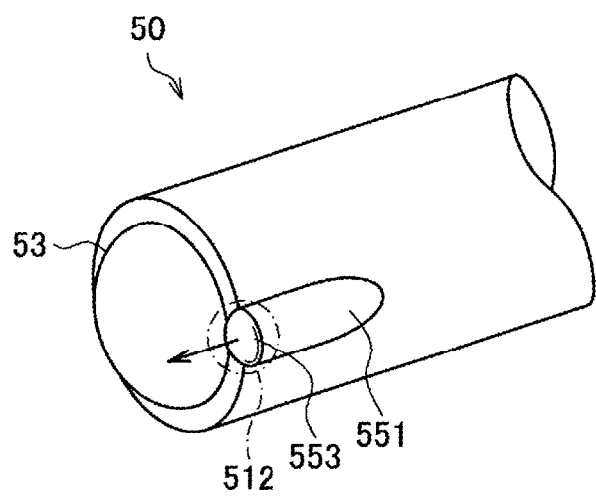
FIG. 21 is an explanatory diagram illustrating an example of a schematic configuration near of a lens of an imaging unit in the information processing device according to Example 5.

In addition, although not illustrated in FIGS. 20 and 21, the information processing device 50 may include other sound collection units different from the sound collection units 511 and 512. In this case, the other sound collection units may be installed to face different directions from the sound collection units 511 and 512. As a more specific example, for example, the other sound collection units may be installed on a surface which is a surface of the casing of the information processing device 50 and is on the opposite side to the imaging direction of the imaging unit 53 to face in the direction (that is, the rear side) on the opposite side to the imaging direction. In this configuration, for example, it is possible to compensate for characteristics of the sound collection units 511 and 512 on a basis of sound collection results of the other sound collection units.

As Example 5, the examples of the information processing device including the imaging device capable of capturing a moving image or a still image have been described above with reference to FIGS. 20 and 21.

2. Second Embodiment

<2.1. Overview>

Next, a second embodiment of the present disclosure will be described. In the information processing device 10 according to the above-described first embodiment, it is possible to reduce the influence of noise such as a wind sound occurring at random by executing the filtering process so that an input of the sound collection unit with a less measurement level (that is, a level of the collected acoustic sound) is prioritized on the basis of the sound collection result of each of the plurality of sound collection units. Through the control, it is possible to alleviate the influence of the noise in the more suitable aspect particularly in a case in which the influence of the noise such as a wind sound occurring at random is larger.

On the other hand, in a case in which the sound collection result of each sound collection unit is evaluated without change as in the above-described control, the sound collection result of the sound collection unit collecting a target sound at a higher level is not used in a situation in which the target sound such as a voice is collected as a main component. That is, in a situation in which the influence of the noise such as a wind sound occurring at random is small, for example, the sound collection result of the sound collection unit with a small signal-to-noise ratio (SN ratio) is used preferentially.

Accordingly, in the embodiment, an example of a structure capable of maintaining an effect of suppressing noise such as a wind sound occurring at random as in the above-described first embodiment and further acquiring a target sound in a more suitable aspect in a case in which an influence of noise occurring at random is small will be proposed.

<2.2. Functional Configuration>

Figure 22:
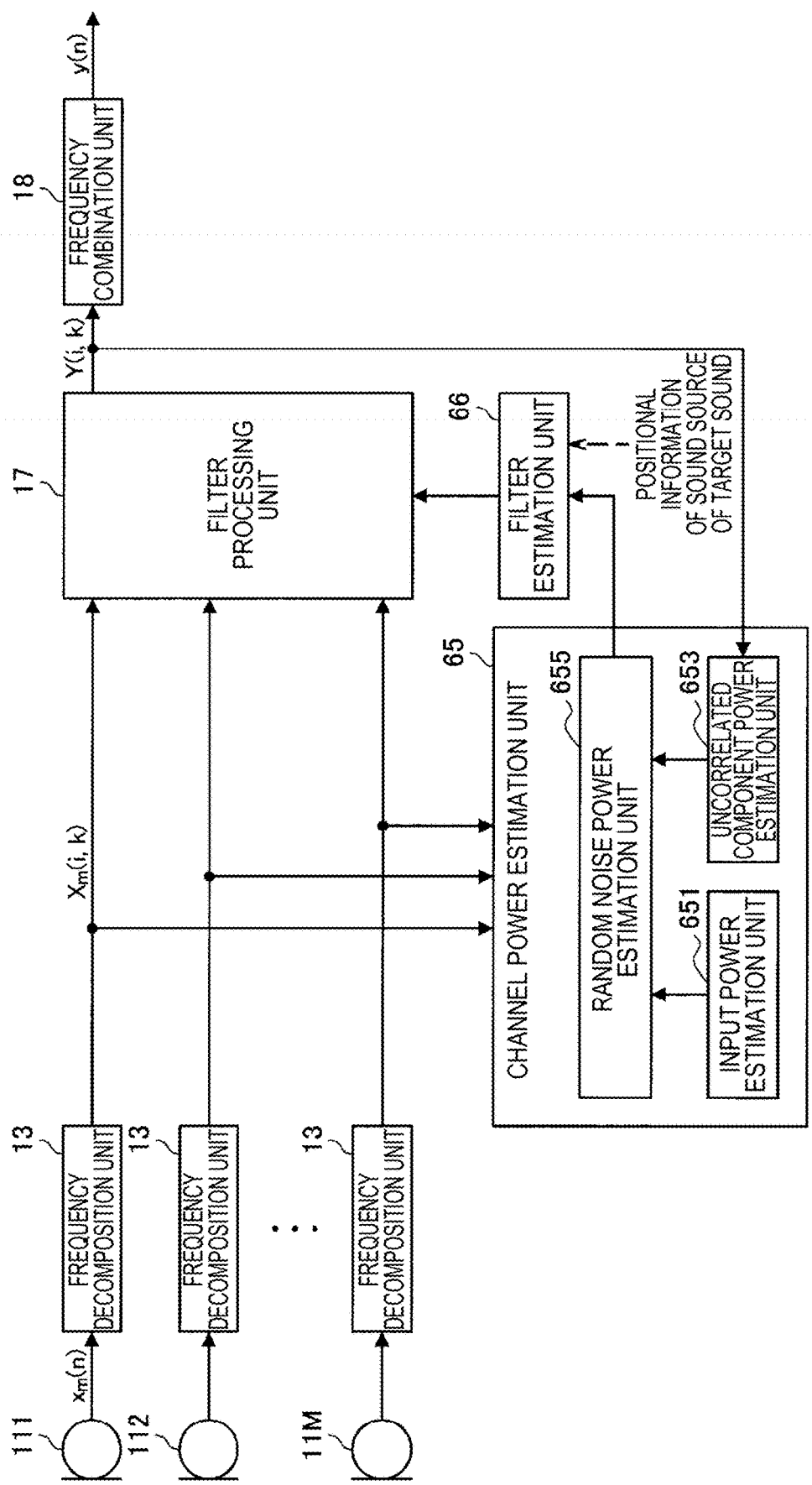
FIG. 22 is a block diagram illustrating an example of a functional configuration of an information processing device according to a second embodiment of the present disclosure.

First, an example of a functional configuration of the information processing device according to the embodiment will be described with reference to FIG. 22. FIG. 22 is a block diagram illustrating an example of a functional configuration of the information processing device according to the embodiment. Also, in the description, the information processing device according to the embodiment is referred to as an "information processing device 60" in some cases to explicitly distinguish the information processing device from the information processing device 10 (see FIG. 6) according to the above-described first embodiment.

As illustrated in FIG. 22, the information processing device 60 according to the embodiment includes a plurality of sound collection units 111 to 11M (where M is a positive integer), a frequency decomposition unit 13, a channel power estimation unit 65, a filter estimation unit 66, a filter processing unit 17, and a frequency combination unit 18. Also, the plurality of sound collection units 111 to 11M (where M is a positive integer), the frequency decomposition unit 13, the filter processing unit 17, and the frequency combination unit 18 are equivalent to the configurations to which the same reference numerals are affixed in the information processing device 10 (see FIG. 6) according to the above-described first embodiment. That is, the information processing device 60 according to the embodiment is different from the information processing device 10 according to the above-described first embodiment in the processing content of the channel power estimation unit 65 and the filter estimation unit 66. Accordingly, the functional configuration of the information processing device 60 according to the embodiment will be described below particularly focusing on differences from the information processing device 10 according to the above-described first embodiment. The detailed description of the same configuration as that of the information processing device 10 will be omitted.

As illustrated in FIG. 22, the channel power estimation unit 65 includes an input power estimation unit 651, an uncorrelated component power estimation unit 653, and a random noise power estimation unit 655.

The input power estimation unit 651 is equivalent to the channel power estimation unit 15 of the information processing device 10 according to the above-described first embodiment. That is, the input power estimation unit 651 estimates a power spectrum of each sound collection unit 110 for each frequency on the basis of each frequency component $X_m(i, k)$ of the acoustic signal $x_m(n)$ corresponding to each sound collection unit 110. Then, the input power estimation unit 651 outputs an estimation result of the power spectrum $P_m(i, k)$ of each sound collection unit 110 for each frequency to the random noise power estimation unit 655.

The uncorrelated component power estimation unit 653 receives a feedback of an output signal $Y(i, k)$ generated by executing the filtering process by the filter processing unit 17. Also, the output signal $Y(i, k)$ is an acoustic sound in which the influence of noise (random noise) is suppressed in each frequency component $X_m(i, k)$ of the acoustic signal $x_m(n)$ collected previously by each sound collection unit 110 and is equivalent to, for example, a frequency component of the target sound such as a voice spoken by a user in each sound collection unit 110. Subsequently, the uncorrelated component power estimation unit 653 estimates a power spectrum $Q_m(i, k)$ of a component uncorrelated with the output signal $Y(i, k)$ on a basis of correlation between each frequency component $X_m(i, k)$ of the acoustic signal $x_m(n)$ corresponding to each sound collection unit 110 and the fed-back output signal $Y(i, k)$. Also, a component uncorrelated with the output signal $Y(i, k)$ (hereinafter also simply referred to as an "uncorrelated component") in the frequency component $X_m(i, k)$ is equivalent to a noise component such as random noise included in the frequency component $X_m(i, k)$. In addition, the details of signal processing by the uncorrelated component power estimation unit 653 will be described separately below. Then, the uncorrelated component power estimation unit 653 outputs an estimation result of the power spectrum $Q_m(i, k)$ of each sound collection unit 110 for each frequency to the random noise power estimation unit 655.

The random noise power estimation unit 655 acquires the estimation result of the power spectrum $P_m(i, k)$ of each sound collection unit 110 for each frequency from the input power estimation unit 651. In addition, the random noise power estimation unit 655 acquires the estimation result of the power spectrum $Q_m(i, k)$ of the uncorrelated component corresponding to each sound collection unit 110 for each frequency from the uncorrelated component power estimation unit 653. Then, the random noise power estimation unit 655 decides a power spectrum $Wm(i, k)$ of each sound collection unit 110 for each frequency used for the filter estimation unit 66 to calculate the filter coefficient $w(i, k)$ on the basis of the estimation results of the acquired power spectrum $Q_m(i, k)$ and the acquired power spectrum $Q_m(i, k)$. Also, the details of a process related to the decision of the power spectrum $Wm(i, k)$ by the random noise power estimation unit 655 will be described separately below. Then, the random noise power estimation unit 655 outputs information indicating the power spectrum $Wm(i, k)$ of each sound collection unit 110 for each frequency to the filter estimation unit 66.

The filter estimation unit 66 calculates the filter coefficient $w(i, k)$ used for the filter processing unit 17 to execute a filtering process on the basis of the information indicating the power spectrum $Wm(i, k)$ of each sound collection unit 110 for each frequency output from the channel power estimation unit 65. Also, at this time, the filter estimation unit 66 is different from the filter estimation unit 16 according to the above-described first embodiment in that the power spectrum $Wm(i, k)$ is applied in place of the power spectrum $Q_m(i, k)$ at the time of generating the matrix $R(i, k)$ described above in (Expression 2).

On the other hand, a subsequent process, that is, the process related to calculation of the filter coefficient $w(i, k)$ on the basis of the array manifold vector $a(k)$ and the generated matrix $R(i, k)$ described above on the basis of (Expression 3) to (Expression 6), is the same as that of the filter estimation unit 16 according to the above-described first embodiment. Therefore, the detailed description of the content of the process will be omitted.

As described above, the filter estimation unit 66 calculates the filter coefficient $w(i, k)$ on the basis of the information indicating the acquired power spectrum $Wm(i, k)$ of each sound collection unit 110 for each frequency and outputs the calculated filter coefficient $w(i, k)$ to the filter processing unit 17. Also, subsequent processes are the same as those of the information processing device 10 (see FIG. 6) according to the above-described first embodiment.

The example of the functional configuration of the information processing device according to the embodiment will be described above with reference to FIG. 22.

<2.3. Details of Uncorrelated Component Power Estimation Unit>

Next, the details of a process of calculating the power spectrum $Q_m(i, k)$ of the uncorrelated component corresponding to each sound collection unit 110 for each frequency in the uncorrelated component power estimation unit 653 will be described.

First, a basic principle for calculating the power spectrum $Q_m(i, k)$ in the uncorrelated component power estimation unit 653 will be described. An acoustic sound (signal) input to a sound collection unit such as a microphone includes, for example, a target sound $S_m$ such as a voice or the like of the user, so-called background noise $N_m$, and random noise $W_m$ such as a wind sound. That is, each frequency component $X_m(i, k)$ of the acoustic signal $x_m(n)$ of each sound collection unit 110 is expressed in a relation expression indicated below as (Expression 8) on the basis of the target sound $S_m$, the background noise $N_m$, and the random noise $W_m$.

[Math. 7]

$$X_m(i,k)=S_m(i,k)+W_m(i,k) \qquad \text{(Expression 8)}$$

Here, when an acoustic sound (signal) input to each of M sound collection units is collected, the acoustic sounds are expressed in a correlation expression indicated below as (Expression 9).

[Math. 8]

$$X=S+N+W=a_k S_{org}+N+W \qquad \text{(Expression 9)}$$

In the foregoing (Expression 9), S is a collection of the target sound $S_m$ of the M sound collection units. Similarly, N is a collection of the background noise $N_m$ of the M sound collection units and W is a collection of the random noise $W_m$ of the M sound collection units. Also, S, N, and W are expressed as vectors. In addition, $S_{org}$ indicates the target sound output from a sound source and is expressed as a scalar value. In addition, $a_k$ is equivalent to the above-described array manifold vector $a(k)$. That is, S indicates a component of the target sound in consideration of an influence of deterioration, delay, or the like of a signal occurring when the target sound $S_{org}$ output from the sound source propagates in a space until the target sound arrives at the sound collection units.

Here, an occurrence timing of the random noise W such as a wind sound is random and can be defined as a signal with no correlation approximately between the plurality of sound collection units (particularly, the sound collection units disposed in a distributive manner, as illustrated in FIG. 1) in the information processing device according to the present disclosure.

Figure 23:
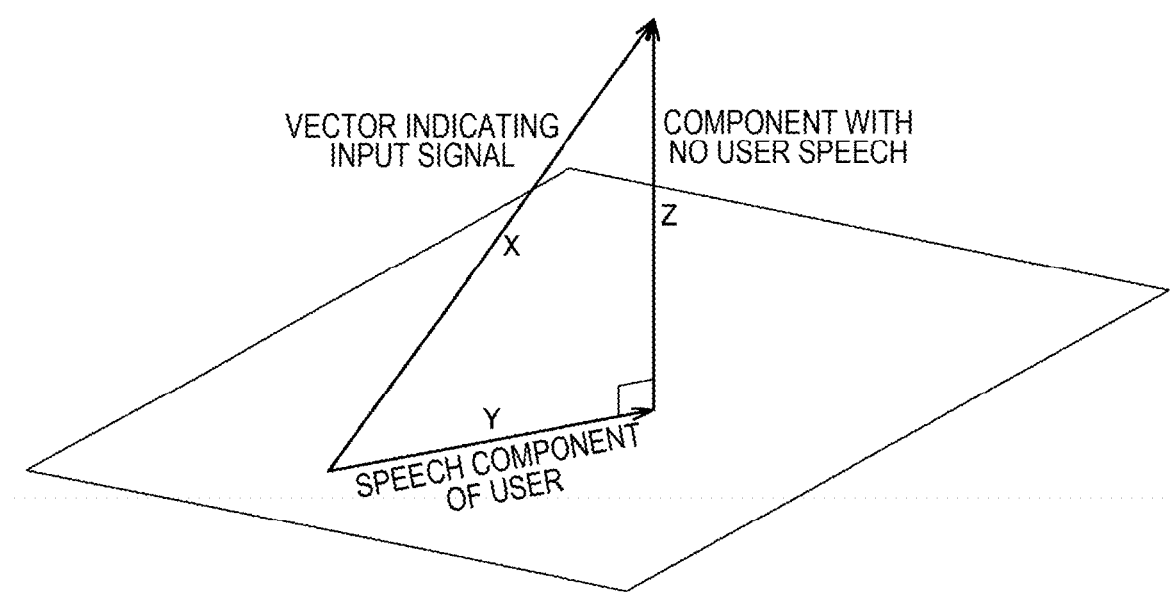
FIG. 23 is an explanatory diagram illustrating a basic principle of a process of an uncorrelated component power estimation unit.

On the basis of the characteristics, the foregoing (Expression 9) can be defined as relation among the vectors illustrated in FIG. 23. FIG. 23 is an explanatory diagram illustrating a basic principle of a process of the uncorrelated component power estimation unit 653. Also, the example illustrated in FIG. 23 shows a case in which a voice spoken by the user is collected as a target sound. In addition, a vector space illustrated in FIG. 23 is defined on the basis of the manifold vector $a_k$.

In FIG. 23, X indicates an acoustic sound (that is, an input signal) collected by the sound collection unit and is equivalent to X expressed in (Expression 9). In addition, Y is ideally equivalent to a component (that is, a speech component of the user) based on the estimation result of the target sound $S_{org}$ in the input signal X. That is, the component Y schematically indicates a speech component of the user (or a component that has correlation with the speech component of the user) among components included in the input signal X. On the other hand, Z is equivalent to a component that has small correlation (or has no correlation) with the speech component of the user among the components included in the input signal X.

Also, when both the background noise N and the random noise W can be suppressed, the component Z is only the components of the background noise N and the random noise W. However, in the configuration in which each sound collection unit is disposed around the neck as in the information processing device (for example, see FIG. 1) according to the present disclosure, the sound collection units are located relatively nearby. Therefore, the background noise N is measured as a component that has correlation among the sound collection units. Therefore, the component Y includes the component of the background noise N in addition to a speech component S of the user. On the other hand, since the random noise W such as a wind sound has small correlation with the speech component of the user, the random noise W is shown as the component Z.

Using the foregoing characteristics, the uncorrelated component power estimation unit 653 extracts the component that has small correlation (or no correlation) with the output signal Y as the component of the random noise W using feedback of the output signal Y (that is, the speech component of the user). Also, in the following description, the component Z is referred to as an "uncorrelated component Z."

For example, in a case in which the number of sound collection units 110 is 4, the array manifold vector $a_k$ is expressed in a calculation expression indicted below as (Expression 10) on the basis of the calculation expression described above as (Expression 4).

[Math. 9]

$$a_k = (a_1(k), a_2(k), a_3(k), a_4(k))^T \quad \text{(Expression 10)}$$

Here, on the basis of an inner product of the input signal X and the manifold vector $a_k$, a component obtained by projecting the input signal X to the manifold vector $a_k$ can be extracted. From the characteristics, the uncorrelated component Z can be extracted as a component orthogonal to the manifold vector $a_k$ on a basis of a calculation expression indicated below as (Expression 11).

[Math. 10]

$$Z = X - a_k \cdot (a_k^H \cdot a_k)^{-1} \cdot a_k^H \cdot X \quad \text{(Expression 11)}$$

Here, in the foregoing (Expression 11), a component indicated as $(a_k^H \cdot a_k)^{-1} \cdot a_k^H \cdot X$ is equivalent to the speech component Y of the user illustrated in FIG. 23. That is, the foregoing (Expression 11) can be expressed as a calculation expression indicated below as (Expression 12).

[Math. 11]

$$Z = X - a_k \cdot Y \quad \text{(Expression 12)}$$

Here, when the output signal Y (that is, the output signal subjected to the filtering process by the filter processing unit 17) fed back as the component Y in the foregoing (Expression 12) is applied, the foregoing (Expression 12) can be expressed as a calculation expression indicated below as (Expression 13) on the basis of the above-described (Expression 6).

[Math. 12]

$$Z = X - a_k \cdot \left( \frac{a^H(k) R(i,k)^{-1}}{a^H(k) R(i,k)^{-1} a_k} \cdot X \right) \quad \text{(Expression 13)}$$

By calculating the power of the signal on the basis of the uncorrelated component Z calculated in this way and executing time smoothing, it is possible to estimate the power spectrum of the uncorrelated component Z. Here, the power spectrum $Q_m(i, k)$ of the uncorrelated component Z corresponding to an i frame and the frequency k in the m-th sound collection unit 110 (that is, the sound collection unit 11m) is expressed in a calculation expression indicated below as (Expression 14). Also, $Z_m^*(i, k)$ in the following (Expression 14) indicates a conjugate complex number of $Z_m(i, k)$. In addition, in (Expression 14), r indicates a smoothing coefficient of a frame direction for suppressing an abrupt change in a power spectrum ($0 \le r < 1$).

[Math. 13]

$$Q_m(i,k) = r \cdot Q_m(i-1,k) + (1-r) \cdot Z_m(i,k) \cdot Z_m^*(i,k) \quad \text{(Expression 14)}$$

In this way, the uncorrelated component power estimation unit 653 calculates the power spectrum $Q_m(i, k)$ of the uncorrelated component.

Also, when the uncorrelated component power estimation unit 653 can use the sound collection results of two or more sound collection units 110 at the time of estimating the power spectrum $Q_m(i, k)$, it is not necessary to use the sound collection results of all the sound collection units 110. As a specific example, in the estimation of the power spectrum $Q_m(i, k)$, the uncorrelated component power estimation unit 653 may not use the sound collection result of the sound collection unit 110 installed at a position at which it is difficult to collection the target sound of a voice or the like as in the sound collection unit 110 located on the rear side of the head of the user.

The details of the process of calculating the power spectrum $Q_m(i, k)$ of the uncorrelated component corresponding to each sound collection unit 110 for each frequency in the uncorrelated component power estimation unit 653 will be described above.

<2.4. Details of Random Noise Power Estimation Unit>

Next, the details of a process of deciding the power spectrum Wm(i, k) of each sound collection unit 110 for each frequency used for the random noise power estimation unit 655 to calculate the filter coefficient w(i, k) will be described.

As described above, the random noise power estimation unit 655 decides the power spectrum Wm(i, k) on the basis of the estimation results of the power spectrum $P_m(i, k)$ acquired from the input power estimation unit 651 and the power spectrum $Q_m(i, k)$ of the uncorrelated component acquired from the uncorrelated component power estimation unit 653.

(Case in which Power Spectrum $Q_m$ is Applied)

For example, the random noise power estimation unit 655 may output the estimation result of the power spectrum $Q_m(i, k)$ of the uncorrelated component as the power spectrum Wm(i, k) to the filter estimation unit 66. Also, in this case, the channel power estimation unit 65 may not include the input power estimation unit 651.

(Case in which Power Spectrum $P_m$ and Power Spectrum $Q_m$ are Selectively Switched)

In addition, as another example, the random noise power estimation unit 655 may selectively output one of the estimation results of the power spectrum $P_m(i, k)$ and the power spectrum $Q_m(i, k)$ on a basis of a predetermined condition as the power spectrum Wm(i, k) to the filter estimation unit 66.

(Case in which Power Spectrum $W_m$ is Adaptively Calculated)

In addition, as still another example, the random noise power estimation unit 655 may adaptively calculate the power spectrum Wm(i, k) on the basis of the estimation results of the power spectrum $P_m(i, k)$ and the power spectrum $Q_m(i, k)$.

For example, the random noise power estimation unit 655 calculates a power spectrum Wm~ in which a relation between a target sound (a voice or the like) and random noise is considered using the power spectrum $P_m(i, k)$ and the power spectrum $Q_m(i, k)$ as inputs on the basis of a calculation expression indicated below as (Expression 15). Also, "$W_m^\sim$" indicates a letter affixed by a tide above "$W_m$." In addition, Pm and Qm shown below are written by generalizing the power spectrum $P_m(i, k)$ and the power spectrum $Q_m(i, k)$.

[Math. 14]

$$\widetilde{W_m} = F(P_m, Q_m) \quad \text{(Expression 15)}$$

For example, the following (Expression 16) indicates a specific example of a function F of calculating the power spectrum $W_m^\sim$ in which a relation between a target sound and random noise is considered using the power spectrum $P_m(i, k)$ and the power spectrum $Q_m(i, k)$ as inputs.

[Math. 15]

$$\widetilde{W_m} = F(P_m, Q_m) = \frac{Q_m}{P_m + Q_m} P_m \quad \text{(Expression 16)}$$

(Expression 16)

Then, the random noise power estimation unit 655 calculates the power spectrum Wm on a basis of a calculation expression indicated below as (Expression 17) on the basis of the power spectrum $W_m^\sim$ in which the above-described relation between the target sound and the random noise is considered. Also, in (Expression 17), r indicates a smoothing coefficient of a frame direction for suppressing an abrupt change in a power spectrum ($0 \leq r < 1$). That is, the random noise power estimation unit 655 may smooth the power spectrum Wm calculated on a basis of a calculation expression indicated below as (Expression 17) between frames on the basis of setting of the coefficient r.

[Math. 16]

$$W_m = r \cdot W_m(i-1, k) + (1-r) \cdot \widetilde{W_m} \quad \text{(Expression 17)}$$

Here, the power spectrum $P_m$ expressed in (Expression 16), that is, the estimation result of the power spectrum $P_m(i, k)$ by the input power estimation unit 651, is equivalent to a level of an acoustic sound collected by the sound collection unit 110, as described above. On the other hand, the power spectrum $Q_m$ expressed in (Expression 16), that is, the estimation result of the power spectrum $Q_m(i, k)$ by the uncorrelated component power estimation unit 653, is equivalent to a level of random noise such as a wind sound. That is, a weight $Q_m/(P_m+Q_m)$ expressed in (Expression 16) changes on the basis of the relation between the target sound such as a voice and the random noise such as a wind sound.

Specifically, in a case in which the signal level of the target sound with respect to the random noise is sufficiently large, the influence of the power spectrum $P_m$ is dominant and the weight $Q_m/(P_m+Q_m)$ becomes smaller. That is, in this case, the weight $Q_m/(P_m+Q_m)$ indicates control for further suppressing use of the sound collection result of a corresponding channel (that is, the sound collection unit 110). Here, the reciprocal of the weight $Q_m/(P_m+Q_m)$ is applied to the calculation of the filter coefficient w(i, k). Therefore, in a case in which the signal level of the target sound with respect to the random noise is sufficiently large, the filter coefficient w(i, k) is calculated so that the use of the sound collection result by the corresponding channel is further prioritized.

Conversely, in a case in which the influence of the random noise such as a wind sound is larger, the influence of the power spectrum $Q_m$ is more dominant and the weight $Q_m/(P_m+Q_m)$ becomes larger. That is, in this case, the weight $Q_m/(P_m+Q_m)$ indicates control for further prioritizing use of the sound collection result of a corresponding channel (that is, the sound collection unit 110). Here, the reciprocal of the weight $Q_m/(P_m+Q_m)$ is applied to the calculation of the filter coefficient w(i, k), as described above. Therefore, in a case in which the influence of the random noise is sufficiently large, the filter coefficient w(i, k) is calculated so that the use of the sound collection result by the corresponding channel is further suppressed.

That is, through the above-described control, the sound collection result of the sound collection unit 110 obtained by collecting a voice at a higher level of the voice is more preferentially used and the filter coefficient w(i, k) is calculated in a situation in which the influence of the random noise such as a wind sound is small and the voice is mainly collected. Thus, in a situation in which the influence of the random noise such as a wind sound is large, as in the above-described first embodiment, the sound collection result of the sound collection unit 110 in which the measurement level is less is more preferentially used and the filter coefficient w(i, k) is calculated. In this way, the random noise power estimation unit 655 can adaptively calculate the power spectrum Wm(i, k) for calculating the filter coefficient w(i, k) in accordance with the relation between the target sound such as a voice and the random noise such as a wind sound.

Then, the random noise power estimation unit 655 may output the power spectrum Wm(i, k) calculated on the basis of the foregoing (Expression 17) to the filter estimation unit 66.

The details of the process of deciding the power spectrum Wm(i, k) of each sound collection unit 110 for each frequency used for the random noise power estimation unit 655 to calculate the filter coefficient w(i, k) has been described above. Also, the above-described example is merely an example. The content is not particularly limited as long as the power spectrum Wm(i, k) can be decided on the basis of the estimation result of at least one of the power spectrum $P_m(i, k)$ and the power spectrum $Q_m(i, k)$.

<2.5. Evaluation>

As described above, the information processing device 60 according to the embodiment estimates the power spectrum $Q_m(i, k)$ of the uncorrelated component on the basis of the sound collection results of at least two sound collection units 110 among the plurality of sound collection units 110 and the feedback of the output signal Y(i, k) of the filter processing unit 17. Then, the information processing device 60 uses the estimation result of the power spectrum $Q_m(i, k)$ of the uncorrelated component in the estimation of the filter coefficient w(i, k). In this configuration, the information processing device 60 can maintain the effect of suppressing noise such as a wind sound occurring at random as in the above-described first embodiment and can further acquire a target sound in the more suitable aspect in a case in which an influence of noise occurring at random is small.

Also, the signal processing according to the embodiment has been described above focusing on, for example, the case of the application to the so-called neckband type wearable device illustrated in FIG. 1. On the other hand, an application destination of the signal processing according to the embodiment is not necessarily limited to only the example illustrated in FIG. 1. Specifically, the signal processing according to the embodiment can be applied as long as a device includes a plurality of sound collection units. Also, more preferably, the plurality of sound collection units may be disposed so that distances from a sound source (for example, a mouth speaking a voice) of a target sound are different. In addition, more preferably, the plurality of sound collection units may be disposed to be located in mutually different directions with respect to the sound source of the target sound.

3. Third Embodiment

<3.1. Overview>

Next, an example of a case in which the technology according to the present disclosure is applied to a so-called multichannel Wiener filter will be described according to a third embodiment of the present disclosure.

First, an overview of the multichannel Wiener filter will be described to further facilitate features of the information processing device according to the embodiment. The multichannel Wiener filter is a technology used to suppress background noise. For example, in a case in which $W_{mwf}$ is the multichannel Wiener filter, $W_{mwf}$ is calculated on a basis of a calculation expression indicated below as (Expression 18).

[Math. 17]

$$W_{mwf} = \underset{W}{\mathrm{argmin}} E[|S - W^H X|^2] \quad \text{(Expression 18)}$$

In the foregoing (Expression 18), S indicates a target sound such as a voice and is equivalent to $S_{org}$ expressed in the above-described (Expression 9). In addition, X indicates an acoustic sound (that is, an input signal) collected by the sound collection unit and is equivalent to X expressed in the above-described (Expression 9). In addition, W schematically indicates a filter to be applied to the input signal X in the multichannel Wiener filter. That is, ideally, the multichannel Wiener filter restores an original signal on a basis of a filter that minimizes a cost function expressed in the foregoing (Expression 18).

However, in general, it is difficult to independently measure the target sound S. Therefore, the measurement is substituted with a minimization problem for trading off signal deterioration against a suppression amount of noise using some of a plurality of channels (that is, the sound collection units) as references. In this case, for example, the multichannel Wiener filter $W_{mwf}$ is expressed in a calculation expression indicated below as (Expression 19).

[Math. 18]

$$W_{mwf} = \underset{W}{\mathrm{argmin}} E[|X_i - W^H X|^2 + \mu |W^H N|^2] \quad \text{(Expression 19)}$$
$$= (R_x + \mu R_n)^{-1} R_x e_i$$

In the foregoing (Expression 19), $X_i$ indicates an output signal based on a sound collection result by a channel used as a reference. Also, in the following description, the channel used as the reference is referred to as a "reference microphone." In addition, N indicates background noise and is equivalent to N expressed in the above-described (Expression 9). In addition, a coefficient μ is a coefficient (weight) set in accordance with a suppression amount of noise with respect to a target sound and, for example, is set in advance on a basis of a result of a previous experiment or the like. In addition, $R_x$ and $R_n$ in the foregoing (Expression 19) are expressed in calculation expressions indicated below as (Expression 20) and (Expression 21). In addition, in (Expression 19), the reference microphone is specified by $e_i$. Here, $e_i$ is an M-order vector that takes 1 for only an i-th value and takes 0 for other values and, for example, is expressed as in the following (Expression 22).

[Math. 19]

$$R_x = E[XX^H] \quad \text{(Expression 20)}$$

$$R_n = E[NN^H] \quad \text{(Expression 21)}$$

$$e_i = [0, \ldots, 1, \ldots 0]^T \quad \text{(Expression 22)}$$

Also, in the foregoing (Expression 20), X indicates an input signal based on a sound collection result by each of the plurality of channels as a vector. That is, $R_x$ is calculated from the input signal X. In addition, in (Expression 21), N indicates an input signal (that is, a signal equivalent to noise) based on a sound collection result by each of the plurality of channels in a section in which a target sound is not collected (hereinafter also referred to as a "pause section") as a vector. Therefore, for example, $R_n$ is calculated in a pause section specified on a basis of a detection result of a section in which a target sound is collected (hereinafter also referred to as a "target sound section"). Also, hereinafter, Rx is also referred to as an "input correlated matrix" and Rn is also referred to as a "noise correlated matrix."

Here, as described above in the other embodiments, random noise such as a wind sound, noise accompanied by vibration, and a rustle accompanied due to wearing of a device is collected by the sound collection unit in some cases in a situation in which a surrounding environment such as a case in which the device is used outdoors dynamically changes. On the other hand, in a case in which the random noise is mixed in the sound collection unit (that is, the reference microphone) fixedly decided by $e_i$ in (Expression 19), it is difficult to suppress the random noise in a multichannel Wiener filter of the related art.

Accordingly, in the embodiment, an example of a structure further reducing an influence of random noise in the multichannel Wiener filter by applying the above-described technology to the multichannel Wiener filter in the other embodiments will be proposed.

Specifically, in the information processing device according to the embodiment, the influence of the random noise is further reduced by adaptively selecting the sound collection unit in which the influence of the random noise is less as the reference microphone on the basis of the estimation result of the above-described power spectrum Pm (or the power spectrum Wm). For example, a calculation expression indicated below as (Expression 23) indicates a basic principle related to derivation of the multichannel Wiener filter $W_{mwf}$ in the information processing device according to the embodiment.

[Math. 20]

$$W_{mwf} = \underset{W}{\mathrm{argmin}} E[|Y - W^H X|^2 + \mu |W^H N|^2] \quad \text{(Expression 23)}$$

As understood in comparison between the foregoing (Expression 23) and the above-described (Expression 19), the output signal Y based on the estimation result of the power spectrum Pm (or the power spectrum Wm) described above in the other embodiments is applied as an output signal X, based on a sound collection result by the reference microphone in the information processing device according to the embodiment. On the basis of the configuration, the information processing device according to the embodiment dynamically select the sound collection unit in which the influence of the random noise is less as the reference microphone even in a situation in which the influence of the random noise is more apparent (that is, a situation in which the surrounding environment dynamically changes). Thus, the information processing device according to the embodiment can further reduce the influence of the random noise and extract a target sound in the more suitable aspect than a device to which a multichannel Wiener filter of the related art is applied. Also, hereinafter, the information processing device according to the embodiment will be further described in detail.

<3.2. Functional Configuration>

Figure 24:
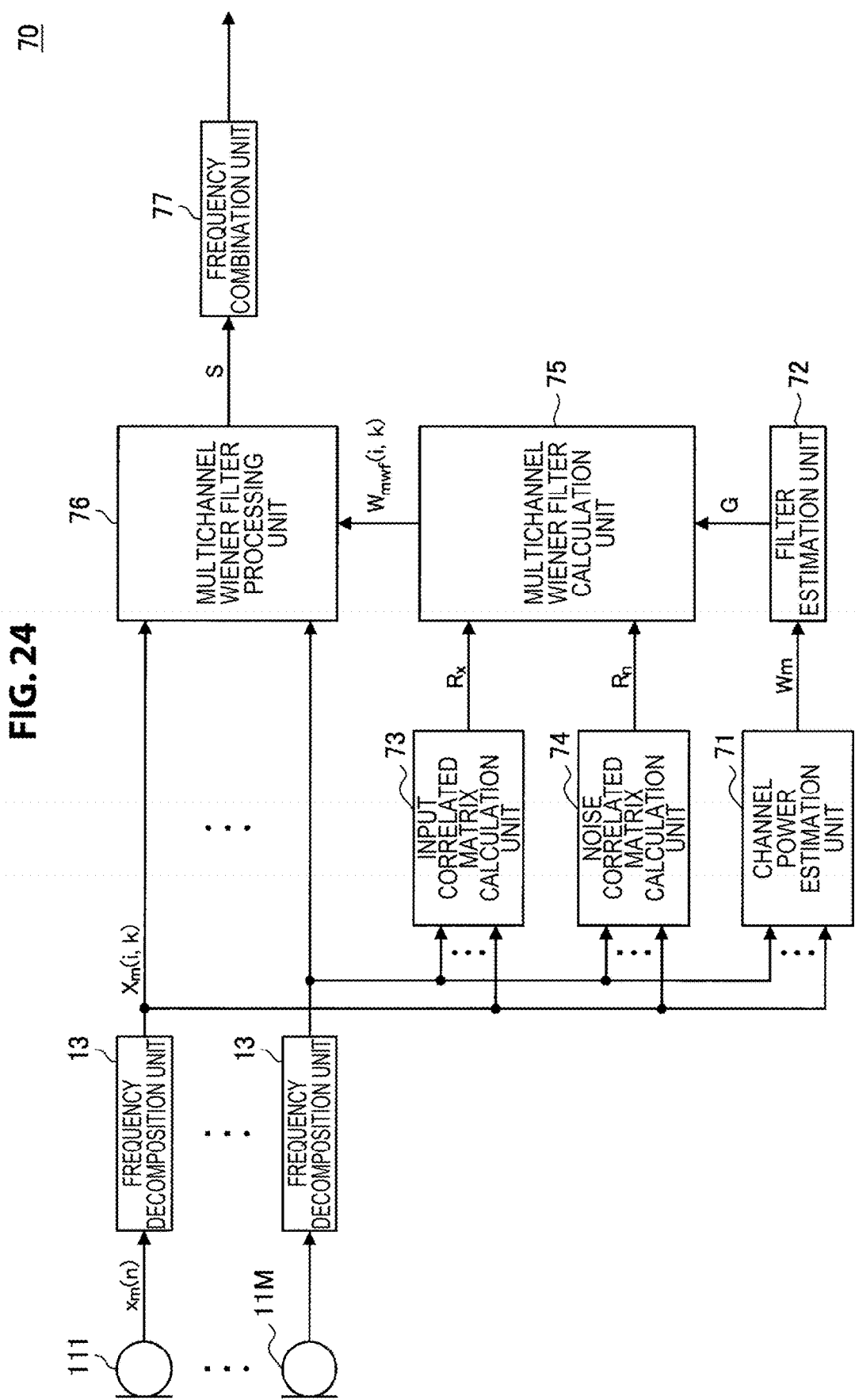
FIG. 24 is a block diagram illustrating an example of a functional configuration of an information processing device according to a third embodiment of the present disclosure.

An example of a functional configuration of the information processing device according to the embodiment will be described with reference to FIG. 24. FIG. 24 is a block diagram illustrating an example of the functional configuration of the information processing device according to the embodiment. Also, in the description, the information processing device according to the embodiment is referred to as an "information processing device 70" in some cases to explicitly distinguish the information processing device from the information processing devices (for example, the information processing devices 10 and 60) according to the above-described other embodiments.

As illustrated in FIG. 24, the information processing device 70 according to the embodiment includes a plurality of sound collection units 111 to 11M (where M is a positive integer), a frequency decomposition unit 13, a channel power estimation unit 71, a filter estimation unit 72, an input correlated matrix calculation unit 73, a noise correlated matrix calculation unit 74, a multichannel Wiener filter calculation unit 75, a multichannel Wiener filter processing unit 76, and a frequency combination unit 77. Also, the plurality of sound collection units 111 to 11M (where M is a positive integer) and the frequency decomposition unit 13 are equivalent to the configurations to which the same reference numerals are affixed in the information processing device 10 (see FIG. 6) according to the above-described first embodiment. That is, the information processing device 70 according to the embodiment is different from the information processing device 10 according to the above-described first embodiment in the processing content of the channel power estimation unit 71, the filter estimation unit 72, the input correlated matrix calculation unit 73, the noise correlated matrix calculation unit 74, the multichannel Wiener filter calculation unit 75, the multichannel Wiener filter processing unit 76, and the frequency combination unit 77. Accordingly, the functional configuration of the information processing device 70 according to the embodiment will be described below particularly focusing on differences from the information processing device 10 according to the above-described first embodiment. The detailed description of the same configuration as that of the information processing device 10 will be omitted.

(Multichannel Wiener Filter Processing Unit 76)

The multichannel Wiener filter processing unit 76 acquires each frequency component $X_m(i, k)$ of the acoustic signal $x_m(n)$ of each sound collection unit 110 from the frequency decomposition unit 13. In addition, the multichannel Wiener filter processing unit 76 acquires the calculation result of the multichannel Wiener filter $W_{mwf}(i, k)$ for each frequency from the multichannel Wiener filter calculation unit 75 to be described below. Also, the details of a method of calculating the multichannel Wiener filter $W_{mwf}(i, k)$ will be described separately below. Also, the multichannel Wiener filter processing unit 76 uses each frequency component $X_m(i, k)$ of the acoustic signal $x_m(n)$ of each sound collection unit 110 as an input signal and generates the output signal S for each frequency by executing a filtering process based on the multichannel Wiener filter $W_{mwf}(i, k)$. For example, the output signal S is expressed in a calculation expression indicated below as (Expression 24). Also, in the following (Expression 24), the frame number i and the discrete frequency number k are not written.

[Math. 21]

$$S = W_{mwf}^H X \qquad \text{(Expression 24)}$$

Then, the multichannel Wiener filter processing unit 76 outputs the output signal S generated for each frequency to the frequency combination unit 77.

(Frequency Combination Unit 77)

The frequency combination unit 77 acquires the output signal S generated for each frequency from the multichannel Wiener filter processing unit 76. The frequency combination unit 77 generates an acoustic signal by combining the acquired output signal S for each frequency. Also, since the process by the frequency combination unit 77 is the same as the process of generating the acoustic signal y(n) by combining the output signal Y(i, k) for each frequency in the frequency combination unit 18 according to the above-described first and second embodiments, the detailed description thereof will be omitted.

(Channel Power Estimation Unit 71 and Filter Estimation Unit 72)

Next, a configuration of the channel power estimation unit 71 and the filter estimation unit 72 will be described. The channel power estimation unit 71 and the filter estimation unit 72 may have the configuration by applying the same structure as that of the information processing device 10 according to the above-described first embodiment or may have the configuration by applying the same structure as that of the information processing device 60 according to the second embodiment. Accordingly, the configuration will be described below focusing each case.

(Configuration Example 1 of Channel Power Estimation Unit 71 and the Filter Estimation Unit 72)

First, a case of the configuration of the channel power estimation unit 71 and the filter estimation unit 72 will be described applying the same structure as that of the first information processing device 10 (see FIG. 6) according to the above-described first embodiment. In this case, the channel power estimation unit 71 and the filter estimation unit 72 are equivalent to the channel power estimation unit 15 and the filter estimation unit 16 according to the first embodiment.

Specifically, the channel power estimation unit 71 estimates the power spectrum $P_m(i, k)$ of each sound collection unit 110 for each frequency on the basis of each frequency component $X_m(i, k)$ of the acoustic signal $x_m(n)$ corresponding to each of the sound collection unit 110.

In addition, the filter estimation unit 72 calculates the filter coefficient w(i, k) on the basis of the estimation result of the power spectrum $P_m(i, k)$. Then, the filter estimation unit 72 calculates a filter G for each frequency on a basis of a calculation result of the filter coefficient w(i, k) and outputs a calculation result of the filter G to the multichannel Wiener filter calculation unit 75 to be described below.

(Configuration Example 2 of Channel Power Estimation Unit 71 and the Filter Estimation Unit 72)

Next, a case of the configuration of the channel power estimation unit 71 and the filter estimation unit 72 will be described applying the same structure as that of the first information processing device 60 (see FIG. 22) according to the above-described second embodiment. In this case, the channel power estimation unit 71 and the filter estimation unit 72 are equivalent to the channel power estimation unit 65 and the filter estimation unit 66 according to the second embodiment.

Specifically, the channel power estimation unit 71 estimates the power spectrum $P_m(i, k)$ of each sound collection unit 110 for each frequency on the basis of each frequency component $X_m(i, k)$ of the acoustic signal $x_m(n)$ corresponding to each of the sound collection unit 110.

In addition, the channel power estimation unit 71 receives a feedback of the acoustic signal for each frequency in which the influence of noise (particularly, random noise) is suppressed on the basis of the filtering process.

As a specific example, the filter estimation unit 72 may receive a feedback of the acoustic signal S for each frequency output as a result of the filtering process by the multichannel Wiener filter processing unit 76.

In addition, as another example, by separately installing a configuration equivalent to the filter processing unit 17 in the information processing device 60 according to the second embodiment, the filter estimation unit 72 may receive the feedback of the acoustic signal for each frequency in which the noise component is suppressed from the configuration. In this case, the filter estimation unit 72 receives the feedback of the acoustic signal equivalent to the output signal $Y(i, k)$ in the information processing device 60 according to the second embodiment.

When the feedback is received, the channel power estimation unit 71 estimates the power spectrum $Q_m(i, k)$ of the acoustic signal and the uncorrelated component on the basis of correlation between the fed-back acoustic signal and the frequency component $X_m(i, k)$ of the acoustic signal $x_m(n)$ corresponding to each sound collection unit 110.

Then, the channel power estimation unit 71 may decide the power spectrum $Wm(i, k)$ of each sound collection unit 110 for each frequency used for the filter estimation unit 72 to calculate the filter coefficient $w(i, k)$ on the basis of the estimation results of the power spectrum $P_m(i, k)$ and the power spectrum $Q_m(i, k)$. Also, since the method of calculating the power spectrum $P_m(i, k)$ and the power spectrum $Q_m(i, k)$ or the method of deciding the power spectrum $Wm(i, k)$ are the same as those of the channel power estimation unit 65 according to the above-described second embodiment, the detailed description thereof will be omitted.

In addition, the filter estimation unit 72 calculates the filter coefficient $w(i, k)$ on the basis of the estimation result of the power spectrum $W_m(i, k)$. Then, the filter estimation unit 72 may calculate the filter G for each frequency on the basis of the calculation result of the filter coefficient $w(i, k)$ and output the calculation result of the filter G to the multichannel Wiener filter calculation unit 75 to be described below.

Also, as described above, the filter G is calculated on the basis of the filter coefficient $w(i, k)$. Therefore, in view of the above-described (Expression 2) to (Expression 6), for example, the filter G can be expressed in calculation expressions indicated below as (Expression 25) and (Expression 26).

[Math. 22]

$$G = \gamma R_w^{-1} a \quad \text{(Expression 25)}$$

$$\gamma = 1/(a^H R_w^{-1} a) \quad \text{(Expression 26)}$$

Also, in the foregoing (Expression 25) and (Expression 26), $R_w$ is equivalent to the matrix $R(i, k)$ in the above-described (Expression 6). That is, in the case of the basis of the same idea as that of the first embodiment, $R_w$ is a matrix based on the estimation result of the power spectrum $P_m(i, k)$. In addition, in the case of the basis of the same idea as that of the first embodiment, $R_w$ is a matrix based on the power spectrum $Wm(i, k)$ decided in accordance with the estimation results of the power spectrum $P_m(i, k)$ and the power spectrum $Q_m(i, k)$.

Subsequently, the input correlated matrix calculation unit 73, the noise correlated matrix calculation unit 74, and the multichannel Wiener filter calculation unit 75 will be described.

(Input Correlated Matrix Calculation Unit 73)

The input correlated matrix calculation unit 73 acquires each frequency component $X_m(i, k)$ of the acoustic signal $x_m(n)$ of each sound collection unit 110 from the frequency decomposition unit 13. Subsequently, the input correlated matrix calculation unit 73 calculates the input correlated matrix $R_x$ for each frequency on the basis of the above-described (Expression 20) using each acquired frequency component $X_m(i, k)$ as an input. Then, the input correlated matrix calculation unit 73 outputs the input correlated matrix $R_x$ calculated for each frequency to the multichannel Wiener filter calculation unit 75.

(Noise Correlated Matrix Calculation Unit 74)

The noise correlated matrix calculation unit 74 acquires each frequency component $X_m(i, k)$ of the acoustic signal $x_m(n)$ of each sound collection unit 110 from the frequency decomposition unit 13. Subsequently, the noise correlated matrix calculation unit 74 specifies a pause section on the basis of the acquisition result of each frequency component $X_m(i, k)$ of the acoustic signal $x_m(n)$. Then, the noise correlated matrix calculation unit 74 calculates the noise correlated matrix $R_n$ for each frequency on the basis of the above-described (Expression 21) using each frequency component $X_m(i, k)$ in the specified pause section as an input. Then, the noise correlated matrix calculation unit 74 outputs the noise correlated matrix $R_n$ calculated for each frequency to the multichannel Wiener filter calculation unit 75.

(Multichannel Wiener Filter Calculation Unit 75)

The multichannel Wiener filter calculation unit 75 acquires the calculation result of the filter G based on the filter coefficient $w(i, k)$ for each frequency from the filter estimation unit 72. In addition, the multichannel Wiener filter calculation unit 75 acquires the calculation result of the input correlated matrix $R_x$ for each frequency from the input correlated matrix calculation unit 73. In addition, the multichannel Wiener filter calculation unit 75 acquires the calculation result of the noise correlated matrix $R_n$ for each frequency from the noise correlated matrix calculation unit 74. Subsequently, the multichannel Wiener filter calculation unit 75 calculates the multichannel Wiener filter $W_{mwf}(i, k)$ for each frequency on the basis of the filter G, the input correlated matrix $R_x$, and the noise correlated matrix $R_n$ acquired for each frequency. Then, the multichannel Wiener filter calculation unit 75 outputs the calculation result of the multichannel Wiener filter $W_{mwf}(i, k)$ to the multichannel Wiener filter processing unit 76. Thus, the multichannel Wiener filter processing unit 76 can execute the filtering process on each frequency component $X_m(i, k)$ of the acoustic signal $x_m(n)$ of each sound collection unit 110 on the basis of the multichannel Wiener filter $W_{mwf}(i, k)$. Also, the more detailed content of the method of calculating the multichannel Wiener filter $W_{mwf}(i, k)$ will be described separately below.

The example of the functional configuration of the information processing device according to the embodiment has been described above with reference to FIG. 24. Also, for example, the multichannel Wiener filter calculation unit 75 and the multichannel Wiener filter processing unit 76 in the configuration of the above-described information processing device 70 are equivalent to an example of an "output control unit."

<3.3. Details of Method of Calculating Multichannel Wiener Filter>

Next, a method of calculating the multichannel Wiener filter $W_{mwf}(i, k)$ will be described in more detail. Also, in the description, the description of the frame number i and the discrete number k will be omitted.

First, the above-described (Expression 23) will be focused on. As described above, the filter G is calculated on the basis of the filter coefficient w(i, k). Therefore, the output signal Y expressed in (Expression 23) can be expressed in a calculation expression indicated below as (Expression 27) in accordance with the input signal X and the filter G based on the filter coefficient w(i, k) in view of the above-described (Expression 7).

[Math. 23]

$$Y = G^H X \quad \text{(Expression 27)}$$

That is, the above-described (Expression 23) can be expressed in a calculation expression indicated below as (Expression 28) in accordance with the output signal Y, the filter G, the input correlated matrix $R_x$, and the noise correlated matrix $R_n$ expressed in the foregoing (Expression 27).

[Math. 24]

$$\begin{aligned} W_{mwf} &= (R_x + \mu R_n)^{-1} E[XY^H] \\ &= (R_x + \mu R_n)^{-1} E[XX^H G] \\ &= (R_x + \mu R_n)^{-1} R_x G \end{aligned} \quad \text{(Expression 28)}$$

Here, as understood in comparison between the foregoing (Expression 28) and the above-described (Expression 19), the foregoing (Expression 28) can be known to be equivalent to a calculation expression in which the matrix $e_i$ specifying the reference microphone is substituted with the filter G in the above-described (Expression 19). In addition, the filter G can also be expressed in a calculation expression indicated below as (Expression 29) in view of the above-described (Expression 25) and (Expression 26).

[Math. 25]

$$G = \begin{pmatrix} g_1 & 0 & 0 \\ 0 & \ddots & 0 \\ 0 & 0 & g_M \end{pmatrix} \begin{pmatrix} a_1 \\ \vdots \\ a_M \end{pmatrix} = [g_1 a_1, \ldots, g_i a_i, \ldots g_M a_M]^T \quad \text{(Expression 29)}$$

Here, in the foregoing (Expression 29), coefficients $g_1, \ldots, g_i, \ldots g_M$ are coefficients decided on the basis of the matrix $R_w$ in (Expression 25) and (Expression 26). More specifically, the coefficients $g_1, \ldots, g_i, \ldots g_M$ are decided on the basis of, for example, the estimation result of the power spectrum $P_m(i, k)$ in the above-described first embodiment or the estimation result of the power spectrum Wm(i, k) in the second embodiment. That is, the coefficients $g_1, \ldots, g_i, \ldots g_M$ indicate weights in accordance with magnitude of the influence of the random noise in each sound collection unit 110 and, in other words, indicate how much the sound collection result of each sound collection unit 110 is reliable as the sound collection result of a target sound.

That is, in the information processing device 70 according to the embodiment, the coefficients $g_1, \ldots, g_i, \ldots g_M$ change in accordance with the sound collection result of the acoustic sound (particularly, random noise) by each sound collection unit 110 and, for example, the sound collection unit 110 in which the influence of the random noise is less is dynamically selected as the reference microphone in accordance with the coefficients.

<3.4. Evaluation>

As described above, the information processing device 70 according to the embodiment estimates the power spectrum (for example, the above-described power spectrum $P_m(i, k)$ or power spectrum Wm(i, k)) of each sound collection unit 110 for each frequency on the basis of each frequency component $X_m(i, k)$ of the acoustic signal $x_m(n)$ corresponding to each sound collection unit 110. Then, the information processing device 70 estimates the filter coefficient w(i, k) on the basis of the estimation result of the power spectrum and uses the estimation result of the filter coefficient w(i, k) to calculate the multichannel Wiener filter $W_{mwf}((i, k)$. In this configuration, the information processing device 70 according to the embodiment can dynamically select the sound collection unit 110 in which the influence of the random noise is less as the reference microphone among the plurality of sound collection units 110. That is, the information processing device 70 according to the embodiment can further reduce the influence of the random noise and further extract the target sound in the more suitable aspect than the case in which the multichannel Wiener filter of the related art in which the reference microphone is fixedly set is applied.

Also, an application destination of the signal processing according to the embodiment is not necessarily limited to only the example of the so-called neckband type wearable device illustrated in FIG. 1. Specifically, the signal processing according to the embodiment can be applied as long as a device includes a plurality of sound collection units. Also, more preferably, the plurality of sound collection units may be disposed so that distances from a sound source (for example, a mouth speaking a voice) of a target sound are different from each other. In addition, more preferably, the plurality of sound collection units may be disposed to be located in mutually different directions with respect to the sound source of the target sound.

<<4. Hardware Configuration>>

Figure 25:
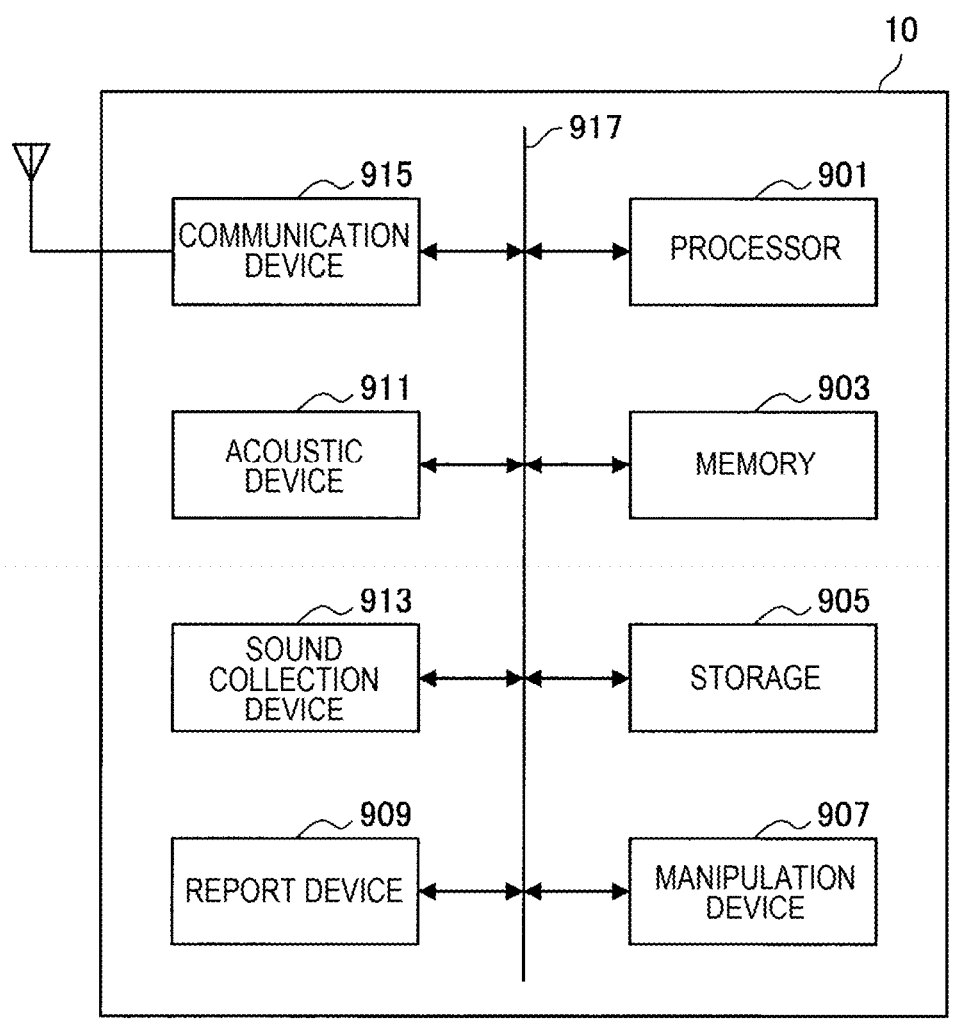
FIG. 25 is a diagram illustrating an example of a hardware configuration of a signal processing device according to the embodiment.

Next, an example of a hardware configuration of the information processing device 10 (that is, the above-described signal processing devices 11 to 14) according to each embodiment of the present disclosure will be described with reference to FIG. 25. FIG. 25 is a diagram illustrating an example of a hardware configuration of the information processing device 10 according to the embodiment of the present disclosure.

As illustrated in FIG. 25, the information processing device 10 according to the embodiment includes a processor 901, a memory 903, a storage 905, a manipulation device 907, a report device 909, an acoustic device 911, a sound collection device 913, and a bus 917. In addition, the information processing device 10 may include a communication device 915.

The processor 901 may be, for example, a central processing unit (CPU), a graphics processing unit (GPU), a digital signal processor (DSP), or a system on chip (SoC) and executes various processes of the information processing device 10. The processor 901 can include, for example, an electronic circuit that executes various arithmetic processes. Also, the frequency decomposition unit 13, the channel power estimation unit 15, the filter estimation unit 16, the filter processing unit 17, and the frequency combination unit 18 described above can be realized by the processor 901.

The memory 903 includes a random access memory (RAM) and a read-only memory (ROM) and stores data and a program executed by the processor 901. The storage 905 can include a storage medium such as a semiconductor memory or a hard disk.

The manipulation device 907 has a function of generating an input signal so that a user executes a desired manipulation. The manipulation device 907 can include, for example, a touch panel. In addition, as another example, the manipulation device 907 may include, for example, an input unit such as a button, a switch, or a keyboard used by the user to input information and an input control circuit that generate an input signal on a basis of an input by the user and supplies the input signal to the processor 901.

The report device 909 is an example of an output device and may be, for example, a device such as a liquid crystal display (LCD) device or an organic light emitting diode (OLED) display. In this case, the report device 909 can report predetermined information to the user by displaying the information on a screen.

Also, the example of the report device 909 described above is merely an example. The aspect of the report device 909 is not particularly limited as long as predetermined information can be reported to a user. As a specific example, the report device 909 may be a device that reports predetermined information to a user by a blinking pattern as in a light emitting diode (LED). In addition, the report device 909 may also be a device that reports predetermined information to a user by executing vibration as in a so-called vibrator.

The acoustic device 911 is a device that reports predetermined information to a user by outputting a predetermined acoustic signal as in a speaker or the like.

The sound collection device 913 is a device that collects a voice spoken from a user or an acoustic sound of a surrounding environment and acquires the sound or the acoustic sound as acoustic information (acoustic signal) as in a microphone. In addition, the sound collection device 913 may acquire data indicating an analog acoustic signal indicating the collected voice or acoustic sound as acoustic information or may convert the analog acoustic signal into a digital acoustic signal and acquire data indicating the converted digital acoustic signal as acoustic information. Also, the above-described sound collection units 110 (for example, the sound collection units 111 to 11M illustrated in FIG. 6) can be realized by the sound collection device 913.

The communication device 915 is communication means included in the information processing device 10 and communicates with an external device via a network. The communication device 915 is a wired or wireless communication interface. In a case in which the communication device 915 is a wireless communication interface, the communication device 915 may include a communication antenna, a radio frequency (RF) circuit, and a baseband processor.

The communication device 915 has a function of executing various kinds of signal processing on a signal received from an external device and can supply a digital signal generated from a received analog signal to the processor 901.

The bus 917 connects the processor 901, the memory 903, the storage 905, the manipulation device 907, the report device 909, the acoustic device 911, the sound collection device 913, and the communication device 915. The bus 917 may include a plurality of types of buses.

In addition, a program that causes hardware such as a processor, a memory, and a storage contained in a computer to exert the same functions as the configuration of the foregoing information processing device 10 can also be generated. In addition, a computer-readable storage medium recording the program can also be provided.

5. Conclusion

As described above, the information processing device 10 according to the embodiments has the projection portion with the streamline shape in at least a part. The sound collection unit 110 is held so that the sound collection unit is located at the front end or near the front end of the projection portion. In this configuration, for example, it is possible to alleviate an influence of noise occurring at random, such as a wind sound, noise accompanied by vibration, and a rustle accompanied due to wearing of the device, and collect the target sound (for example, a voice of the user) in the more suitable aspect.

In addition, the information processing device 10 according to the embodiment may include the plurality of sound collection units 110. The plurality of sound collection units 110 may be held so that the sound collection units 110 face in mutually different directions. In this configuration, even in a situation in which noise such as a wind sound, noise accompanied by vibration, and a rustle accompanied due to wearing of the device occurs at random, it is possible to compensate for the characteristics of the other sound collection units on the basis of the sound collection results of some of the sound collection units (that is, the sound collection units for which the influence of the noise is small).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a sound collection unit; and
a holding member configured to have a projection portion with a streamline shape in at least a part and hold the sound collection unit so that the sound collection unit is located at a front end or near the front end of the projection portion.

(2)
The information processing device according to (1), further including: one or more second sound collection units configured to be different from a first sound collection unit which is the sound collection unit in addition to the first sound collection unit.

(3)
The information processing device according to (2), in which
the holding member holds the plurality of second sound collection units so that the plurality of second sound collection units face in mutually different directions.

(4)
The information processing device according to (1), in which
the holding member is worn on a predetermined part of a user and holds the sound collection unit so that the sound collection unit and the part have a predetermined positional relation.

(5)
The information processing device according to (4), in which
the part is a neck, and
in a case in which the holding member is worn on the neck, the projection portion is installed so that the front end of the projection portion faces in a substantially front side of the user.

(6)
The information processing device according to (4) or (5), including:
a plurality of second sound collection units configured to be different from a first sound collection unit which is the sound collection unit in addition to the first sound collection unit,
in which at least two second sound collection units of the plurality of second sound collection units are held at mutually substantially symmetric positions setting the part as a reference.

(7)
The information processing device according to (2), including:
a signal processing unit configured to suppress a noise component in regard to an acoustic sound arriving to the first sound collection unit in a predetermined direction on a basis of an acoustic sound collected from each of the first sound collection unit and the one or more second sound collection units.

(8)
The information processing device according to (7), in which
the signal processing unit estimates a signal level of each frequency component of an acoustic on the basis of the acoustic sound collected from each of the first sound collection unit and the one or more second sound collection units and suppresses the noise component on a basis of an estimation result of the signal level.

(9)
The information processing device according to (7), in which
on a basis of correlation between a first acoustic sound collected from at least each of a plurality of sound collection units among the first sound collection unit and the one or more second sound collection units and a second acoustic sound of which the noise component is suppressed through a previous process, the signal processing unit suppresses the noise component included in the first acoustic sound.

(10)
The information processing device according to (9), in which
the holding member holds the plurality of sound collection units so that distances between a predetermined sound source and at least two sound collection units of the plurality of sound collection units are different from each other.

(11)
The information processing device according to (9) or (10), in which
the holding member holds the plurality of sound collection units so that each of at least two sound collection units of the plurality of sound collection units are located in mutually different directions with respect to a predetermined sound source.

(12)
The information processing device according to (2), including:
an output control unit configured to selectively output acoustic sounds collected by some of sound collection units among the first sound collection unit and the one or more second sound collection units,
in which the output control unit estimates a signal level of each frequency component of an acoustic sound on a basis of the acoustic sound collected from each of the first sound collection unit and the one or more second sound collection units and selects the some of the sound collection units on a basis of an estimation result of the signal level.

(13)
The information processing device according to (12), in which
the output control unit includes a multichannel Wiener filter and selects a reference microphone of the multichannel Wiener filter on the basis of the estimation result of the signal level.

(14)
The information processing device according to (1), in which
the holding member is a casing that has a substantially rectangular surface in at least a part, and
the casing has the projection portion in a predetermined region including a corner of the substantially rectangular surface and holds the sound collection unit at a front end or near the front end of the projection portion.

(15)
The information processing device according to (14), in which
the information processing device includes a plurality of the sound collection units, and
the casing has, for each of a plurality of corners among corners of the substantially rectangular surface, the projection portion in a predetermined region including the corner, and holds the sound collection units at a front end or near the front end of the projection portion.

(16)

The information processing device according to (14) or (15), including:

a band portion configured to hold the casing in regard to an arm of a user, in which, in a case in which the information processing device is worn on the arm, the band portion includes another sound collection unit different from the sound collection units at a position substantially symmetric to the casing setting the arm as a reference.

(17)

The information processing device according to (1), in which the holding member is a glasses type frame worn on a head of a user, and the frame has the projection portion in at least a part of a front and holds the sound collection unit at a front end or near the front end of the projection portion.

(18)

The information processing device according to (17), in which the frame has the projection portion in a bridge or near the bridge and holds the sound collection unit at a front end or near the front end of the projection portion.

REFERENCE SIGNS LIST 10 information processing device
13 frequency decomposition unit
15 channel power estimation unit
16 filter estimation unit
17 filter processing unit
18 frequency combination unit
110 to 113 sound collection unit
60 information processing device
65 channel power estimation unit
651 input power estimation unit
653 uncorrelated component power estimation unit
655 random noise power estimation unit
66 filter estimation unit

The invention claimed is:

1. An information processing device comprising:
a first sound collection device;
a second sound collection device configured to be different from the first sound collection device;
a user report device configured to report predetermined information to a user by lighting with a blinking pattern;
a holding member configured to hold the first sound collection device, the second sound collection device and the user report device; and
a signal processing device configured to:
on a basis of an acoustic sound collected from the first sound collection device and of an acoustic sound collected from the second sound collection device, suppress a noise component in a first acoustic sound collected from one or more of the first sound collection device and the second sound collection device, and
on the basis of the acoustic sound collected from the first sound collection device and of the acoustic sound collected from the second sound collection device, extract a voice spoken by the user while the holding member is worn on the neck of the user,
wherein the holding member has a partially opened ring shape and a projection portion with a streamline shape in at least a part of an end of the projection portion, and
in a case in which the holding member is worn on the neck of the user, the holding member holds the first sound collection device facing a substantially upward vertical direction and the second sound collection device facing a substantially front side of the user.

2. The information processing device according to claim 1, further comprising an input device configured to receive input information from the user.

3. The information processing device according to claim 1, further comprising a communication device configured to communicate with an external device and provide the voice extracted.

4. The information processing device according to claim 1, wherein:
the signal processing device is configured to suppress a first noise component in an acoustic sound arriving to the first sound collection device in a predetermined direction on a basis of an acoustic sound collected from each of the first sound collection device and the second sound collection device.

5. The information processing device according to claim 4, wherein
the signal processing device is configured to estimate a signal level of each frequency component of an acoustic sound on a basis of the acoustic sound collected from each of the first sound collection device and the second sound collection device and suppress the first noise component on a basis of an estimation result of the signal level.

6. The information processing device according to claim 1, wherein
the holding member is configured to hold a plurality of sound collection devices so that distances between a predetermined sound source and at least two sound collection devices of the plurality of sound collection devices are different from each other.

7. The information processing device according to claim 1, wherein
the holding member is configured to hold a plurality of sound collection devices so that each of at least two sound collection devices of the plurality of sound collection devices are located in mutually different directions with respect to a predetermined sound source.

8. The information processing device according to claim 1, wherein
the holding member is a glasses type frame worn on a head of a user, and
the frame has the projection portion in at least a part of a front and holds the first sound collection device at a front end or near the front end of the projection portion.

9. The information processing device according to claim 8, wherein
the frame has the projection portion in a bridge or near the bridge and holds the first sound collection device at or near a front end of the projection portion.

* * * * *